(12) United States Patent
Kuge

(10) Patent No.: US 12,245,141 B2
(45) Date of Patent: Mar. 4, 2025

(54) USER EQUIPMENT, INTRA-CORE NETWORK APPARATUS, AND COMMUNICATION CONTROL METHOD

(71) Applicant: SHARP KABUSHIKI KAISHA, Sakai (JP)

(72) Inventor: Yoko Kuge, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 459 days.

(21) Appl. No.: 17/628,654

(22) PCT Filed: Jul. 21, 2020

(86) PCT No.: PCT/JP2020/028265
§ 371 (c)(1),
(2) Date: Jan. 20, 2022

(87) PCT Pub. No.: WO2021/015200
PCT Pub. Date: Jan. 28, 2021

(65) Prior Publication Data
US 2022/0256450 A1    Aug. 11, 2022

(30) Foreign Application Priority Data

Jul. 22, 2019 (JP) .................. 2019-134403

(51) Int. Cl.
*H04W 48/18* (2009.01)
*H04W 12/06* (2021.01)
(Continued)

(52) U.S. Cl.
CPC ........... *H04W 48/18* (2013.01); *H04W 12/06* (2013.01); *H04W 48/16* (2013.01); *H04W 60/04* (2013.01)

(58) Field of Classification Search
CPC ...... H04W 48/18; H04W 12/06; H04W 48/16; H04W 60/04; H04W 12/08
See application file for complete search history.

(56) References Cited

U.S. PATENT DOCUMENTS

2019/0029065 A1\* 1/2019 Park .................. H04W 8/08
2019/0124561 A1   4/2019 Faccin et al.
(Continued)

FOREIGN PATENT DOCUMENTS

WO    2019078964 A1    4/2019

OTHER PUBLICATIONS

Telecom Italia et al, "Introduction of Slice-Specific Authentication and Authorisation", Change Request S2-1906591, 3GPP TSG-SA WG2 Meeting #133 May 13-17, 2016, Reno NV, 8 pages (Year: 2019).\*

(Continued)

*Primary Examiner* — Thu V Nguyen
*Assistant Examiner* — Ranjan Pant
(74) *Attorney, Agent, or Firm* — ScienBiziP, P.C.

(57) ABSTRACT

According to an aspect of the present invention, a procedure and a communicator for initial registration of UE or periodic or mobility-based registration for achieving Network Slice Specific Authentication and Authorization in 5GS. Furthermore, a communicator for achieving a function related to Network Slice Specific Authentication and Authorization in 5GS is provided by providing a procedure and a communicator for changing a UE configuration initiated by a network, the procedure being initiated based on the Network Slice Specific Authentication and Authorization initiated by the network and completion of the Network Slice Specific Authentication and Authorization.

4 Claims, 11 Drawing Sheets

(51) Int. Cl.
*H04W 48/16* (2009.01)
*H04W 60/04* (2009.01)

(56) References Cited

U.S. PATENT DOCUMENTS

| | | | |
|---|---|---|---|
| 2020/0162919 A1* | 5/2020 | Velev | H04W 60/00 |
| 2021/0258836 A1 | 8/2021 | Faccin et al. | |
| 2021/0368339 A1* | 11/2021 | Watfa | H04W 12/08 |

OTHER PUBLICATIONS

Huawei et al, "Correction to rejected NSSAI deletion", Change Request C1-193745, 3GPP TSG-SA WG1 Meeting #117, May 13-17, 2016, Reno NV, sectiopn 4.6.2.2, 3 pages (Year: 2019).*

3GPP "3rd Generation Partnership Project; Technical Specification Group Services and System Aspects; Security Aspects; Study on Security Aspects of Enhanced Network Slicing (Release 16)", 3GPP TR 33.813 V0.5.0 (Jun. 2019), 66 pages (Year: 2019).*

"3rd Generation Partnership Project; Technical Specification Group Services and System Aspects; System Architecture for the 5G System; Stage 2(Release 16)", 3GPP TS 23.501 V16.1.0 (Jun. 2019).

"3rd Generation Partnership Project; Technical Specification Group Services and System Aspects; Procedures for the 5G System; Stage 2(Release 16)", 3GPP TS 23.502 V16.1.1 (Jun. 2019).

"3rd Generation Partnership Project; Technical Specification Group Core Network and Terminals; Non-Access-Stratum (NAS) protocol for 5G System (5GS);Stage 3(Release 16)", 3GPP TS 24.501 V16.1.0 (Jun. 2019).

Telecom Italia, "23.501 NSSAI reject issues", S2-177890, SA WG2 Meeting #123, Oct. 23-27, 2017, Ljubljana, Slovenia.

Huawei et al., "Correction to rejected NSSAI deletion.", C1-193745, 3GPP TSG-CT WG1 Meeting #117, Reno (NV), USA, May 13-17, 2019.

"3rd Generation Partnership Project; Technical Specification Group Services and System Aspects; Security Aspects; Study on Security Aspects of Enhanced Network Slicing (Release 16)", 3GPP TR 33.813 V0.5.0 (Jun. 2019), Jul. 9, 2019, p. 12 (Document showing a well-known art).

* cited by examiner

USER EQUIPMENT, INTRA-CORE NETWORK APPARATUS, AND COMMUNICATION CONTROL METHOD

TECHNICAL FIELD

The present application relates to a user equipment, an intra-core network apparatus, and a communication control method. This application claims the benefit of priority to JP 2019-134403 filed on Jul. 22, 2019, which is incorporated herein by reference in its entirety.

BACKGROUND ART

The 3rd Generation Partnership Project (3GPP), which undertakes activities for standardizing recent mobile communication systems, has studied. System Architecture Evolution (SAE) which is a system architecture of Long Term Evolution (LTE).

The 3GPP has recently studied next-generation communication technologies and system architectures for a 5th generation (5G) mobile communication system which is a next generation mobile communication system, and in particular, has standardized a 5G system (5GS) as a system for realizing a 5G mobile communication system (see NPL 1 and NPL 2). In the 5GS, technical problems attributable to connection of various terminals to a cellular network are extracted to standardize solutions.

CITATION LIST

Non Patent Literature

NPL 1: 3GPP TS 23.501 V16.1.0 (2019-06); 3rd Generation Partnership Project; Technical Specification Group Services and System Aspects; System Architecture for the 5G System; Stage 2 (Release 16)

NPL 2: 3GPP TS 23.502 V16.1.1 (2019-06); 3rd Generation Partnership Project; Technical Specification Group Services and System Aspects; Procedures for the 5G System; Stage 2 (Release 16)

NPL 3: 3GPP TS 24.501 V16.1.0 (2019-06); 3rd Generation Partnership Project; Technical Specification Group Core Network and Terminals; Non-Access-Stratum (NAS) protocol for 5G System (5GS); Stage 3 (Release 16)

SUMMARY OF INVENTION

Technical Problem

In the 5G System (5GS), in order to provide various services, a 5G Core Network (5GCN) corresponding to a new core network has been studied.

Furthermore, for 5G, a network slice has been defined that corresponds to a logical network providing specific network functions and specific network performance for a specific service type or a specific group. For example, the network slice may be a logical network provided for terminals with low latency capability, or may be a logical network provided for sensor terminals used for Internet of Things (Internet).

In 3GPP, Enhancement of Network Slicing (eNS) has been studied in order to examine additional functions associated with network slices. Furthermore, for eNS, Network Slice-specific Authentication and Authorization has been studied that includes an authentication procedure performed for each network slice in addition to a known UE-by-UE authentication procedure.

Studies have been conducted about a response made by a network in a case that UE requests, through a registration request to the UE, an allowance for connection to a network slice requiring Network Slice-specific Authentication and Authorization, the response being made in a pending state of notification determination of whether the connection to the network slice requested by the UE is to be allowed or rejected.

However, no specific measures and methods used by the UE and the network to manage information related to the pending network slice in the pending state of the network slice have been clarified.

The present invention is made in the light of the circumstances as described above, and has an object to provide a method of implementing functions for eNS in the 5GS.

Solution to Problem

An embodiment of the present invention provides a user equipment including a transmission and/or reception unit and a controller, the transmission and/or reception unit being configured to receive, from a first location management apparatus in a core network, a first registration accept message including first Network Slice Selection Assistance Information (NSSAI) including Single NSSAI (S-NSSAI) and a cause value, the controller being configured to store, based on reception of the first. NSSAI and the cause value, the S-NSSAI such that the S-NSSAI is included in second NSSAI, the transmission and/or reception unit being configured to receive a second registration accept message from a second location management apparatus in the core network, and the controller being configured to delete the second NSSAI based on reception of the second registration accept message, wherein the first NSSAI is information for identifying a slice to which access is rejected by the first location management apparatus, the cause value is information indicating that acceptance of the S-NSSAI is made pending because of a network slice-specific authentication and authorization procedure, the second NSSAI is information, managed by the UE, for identifying one or multiple slices to which access is rejected by the core network due to the pending acceptance because of the network slice-specific authentication and authorization procedure, and the second NSSAI is information that is not dependent on an access type.

An embodiment of the present invention provides a first intra-core network apparatus provided with an access mobility management function, the first intra-core network apparatus including a transmission and/or reception unit and a controller, the transmission and/or reception unit being configured to transmit, to a user equipment, a registration accept message including first Network Slice Selection Assistance Information (NSSAI) including a cause value and Single NSSAI (S-NSSAI), the controller being configured to store the S-NSSAI as second NSSAI based on transmission of the first NSSAI and the cause value, receive a request message for user equipment information from a second intra-core network apparatus including an access mobility management function, and transmit the user equipment information to the second intra-core network apparatus, wherein the first NSSAI is information for identifying a slice to which access is rejected by the core network, the cause value is information indicating that acceptance of the S-NSSAI is made pending because of a network slice-specific authentication and authorization procedure, the second NSSAI is information, managed by the core network, for identifying a slice to which access from the user equipment is rejected due to the pending acceptance because of the network slice-specific authentication and authorization procedure, the second NSSAI is information that is not dependent on an access type, and the user equipment information includes the second NSSAI.

An embodiment of the present invention provides a communication control method for a user equipment, the communication control method including the steps of receiving, from a first location management apparatus in a core network, a first registration accept message including first Network Slice Selection Assistance Information (NSSAI) including Single NSSAI (S-NSSAI) and a cause value, storing, based on reception of the first NSSAI and the cause value, the S-NSSAI such that the S-NSSAI is included in second NSSAI, receiving a second registration accept message from a second location management apparatus in the core network, and deleting the second NSSAI based on reception of the second registration accept message, wherein the first NSSAI is information for identifying a slice to which access is rejected by the first location management apparatus, the cause value is information indicating that acceptance of the S-NSSAI is made pending because of a network slice-specific authentication and authorization procedure, the second NSSAI is information, managed by the UE, for identifying one or multiple slices to which access is rejected by the core network due to the suspension of the acceptance because of the network slice-specific authentication and authorization procedure, and the second NSSAI is information that is not dependent on an access type.

An embodiment of the present invention provides a communication control method for a first intra-core network apparatus provided with an access mobility management function, the communication control method including the steps of transmitting, to a user equipment, a registration accept message including first Network Slice Selection Assistance Information (NSSAI) including a cause value and Single NSSAI (S-NSSAI), storing the S-NSSAI as second NSSAI based on transmission of the first NSSAI and the cause value, receiving a request message for user equipment information from a second intra-core network apparatus provided with an access mobility management function, and transmitting the user equipment information to the second intra-core network apparatus, wherein the first NSSAI is information for identifying a slice to which access is rejected by the core network, the cause value is information indicating that acceptance of the S-NSSAI is made pending because of a network slice-specific authentication and authorization procedure, the second NSSAI is information, managed by the core network, for identifying a slice to which access from the user equipment is rejected due to the pending acceptance because of the network slice-specific authentication and authorization procedure, the second NSSAI is information that is not dependent on an access type, and the user equipment information includes the second NSSAI.

Advantageous Effects of Invention

According to an aspect of the present invention, in the 5GS, eNS can be supported, allowing the support of the Network Slice-specific Authentication and Authorization. Furthermore, the UE supporting the Network Slice-specific Authentication and Authorization can register with the core network supporting the Network Slice-specific Authentication and Authorization.

DESCRIPTION OF EMBODIMENTS

A preferred embodiment for carrying out the present invention will be described below with reference to the drawings. Note that, as an example, an embodiment of a mobile communication system to which the present invention is applied will be described in the present embodiment.

1. OVERVIEW OF SYSTEM

Figure 1:
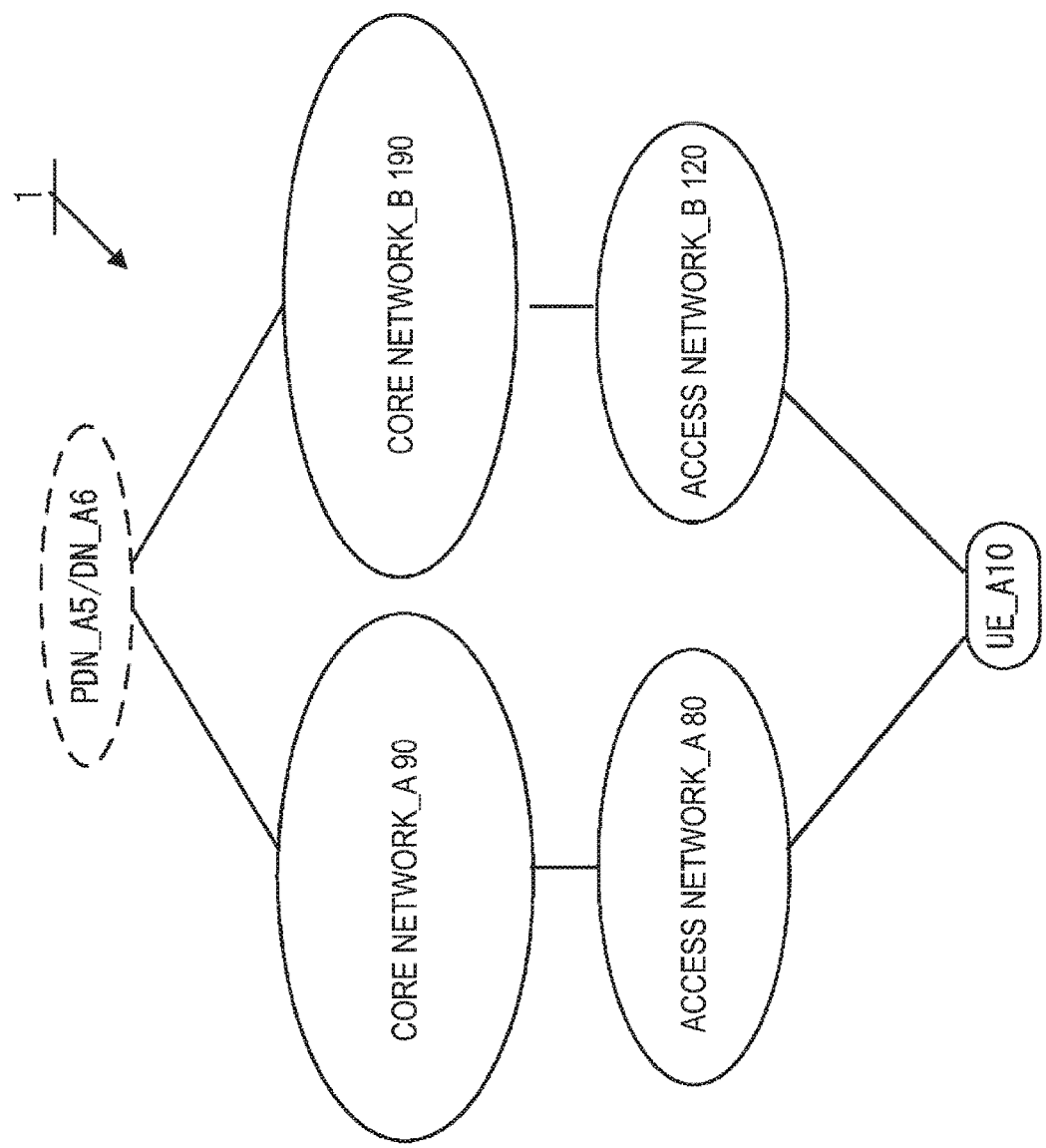
FIG. 1 is a diagram illustrating an outline of a mobile communication system (EPS/5GS).
Figure 2:
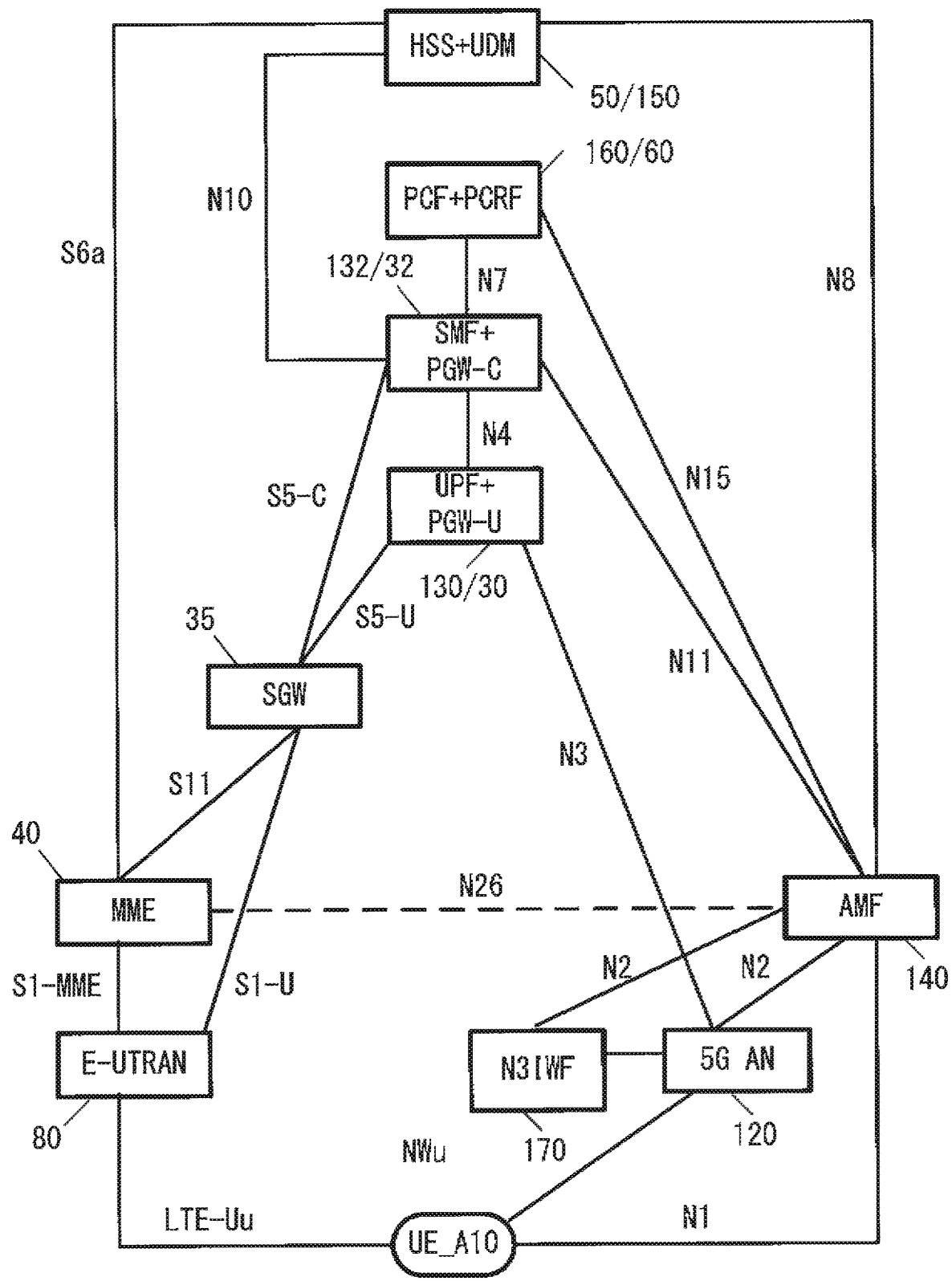
FIG. 2 is a diagram illustrating a detailed configuration of the mobile communication system (EPS/5GS).

First, FIG. 1 is a diagram for illustrating an outline of a mobile communication system 1 used in each embodiment, and FIG. 2 is a diagram for illustrating a detailed configuration of the mobile communication system 1.

In the illustration of FIG. 1, the mobile communication system 1 includes a UE_A 10, an access network_A 80, a core network_A 90, a Packet Data Network (PDN)_A 5, an access network_B 120, a core network_B 190, and a Data Network (DN)_A 6.

Symbols may hereinafter be omitted from the designations of the apparatuses and functions described above, such as in a UE, an access network_A, a core network_A, a PDN, an access network_B, a core network_B, and a DN.

FIG. 2 illustrates apparatuses and functions such as a UE_A 10, an E-UTRAN 80, an MME 40, an SGW 35, a PGW-U 30, a PGW-C 32, a PCRF 60, an HSS 50, a 5G AN 120, an AMF 140, a UPF 130, an SMF 132, a PCF 160, a UDM 150, and an N3IWF 170 and interfaces for connecting these apparatuses and functions to one another.

Symbols may hereinafter be omitted from the designations of the apparatuses and functions described above, such as in a UE, an E-UTRAN, an MME, an SGW, a PGW-U, a PGW-C, a PCRF, an HSS, a 5G AN, an AMF, a UPF, an SME, a PCF, a UDM, and an N3IWF.

Note that an Evolved Packet System (EPS) being a 4G system includes the access network_A and the core network_A. The EPS may further include the UE and/or the PDN. A 5G System (5GS) being a 5G system includes the UE, the access network_B, and the core network_B. The 5GS may further include the DN.

The UE is an apparatus that can connect to a network service via 3GPP access (also referred to as a 3GPP access network or a 3GPP AN) and/or non-3GPP access (also referred to as a non-3GPP access network or a non-3GPP AN). The UE may be a terminal apparatus capable of radio communication, such as a mobile phone and a smartphone, and may be a terminal apparatus that can connect to both the EPS and the 5GS. The UE may include a Universal Integrated Circuit Card (UICC) and an Embedded UICC (eUICC). Note that the UE may be referred to as a user equipment, or may be referred to as a terminal apparatus.

The access network_A corresponds to an Evolved Universal Terrestrial Radio Access Network (E-UTRAN) and/or a radio LAN access network. In the E-UTRAN, one or more evolved Node Bs (eNBs) 45 are deployed. Note that, in the following, the symbol of the eNB 45 may be omitted in description, such in as an eNB. In a case that there are multiple eNBs, the eNBs are connected to each other via, for example, the X2 interface. In the radio LAN access network, one or more access points are deployed.

The access network_B corresponds to a 5G access network (5G AN). The 5G AN includes an NG Radio Access Network (NG-RAN) and/or a non-3GPP access network. In the NG-RAN, one or more NR NodeBs (gNBs) 122 are deployed. Note that, in the following, the symbol of the gNB 122 may be omitted in description, such in as an eNB. The gNB is a node that provides a New Radio (NR) user plane and control plane to the UE, and is a node that connects to a 5GCN via the NG interface (including the N2 interface or the N3 interface). In other words, the gNB is a base station apparatus newly designed for the 5GS, and has functions different from those of the base station apparatus (eNB) used in the EPS being the 4G system. In a case that there are multiple gNBs, the gNBs are connected to each other via, for example, the Xn interface.

The non-3GPP access network may be an untrusted non-3GPP access network or a trusted non-3GPP access network. In this regard, the non-trusted non-3GPP access network may be a non-3GPP access network that does not perform security management within the access network, for example, a public wireless LAN or the like. On the other hand, the trusted non-3GPP access network may be an access network defined by the 3GPP, and may include a trusted non-3GPP access point (TNAP) and a trusted non-3GPP Gateway function (TNGF).

In the following, the E-UTRAN and the NG-RAN may be referred to as 3GPP access. The radio LAN access network and the non-3GPP AN may be referred to as non-3GPP access. The nodes deployed in the access network_B may also be collectively referred to as NG-RAN nodes.

In the following, the access network_A, and/or the access network_B, and/or an apparatus included in the access network_A, and/or an apparatus included in the access network_B may be referred to as an access network or an access network apparatus.

The core network_A corresponds to an Evolved Packet Core (EPC). In the EPC, for example, the Mobility Management Entity (MME), the Serving Gateway (SGW), the Packet Data Network Gateway (PGW)-U, the PGW-C, the Policy and Charging Rules Function (PCRF), the Home Subscriber Server (HSS), and the like are deployed.

The core network_B corresponds to a 5G Core Network (5GCN). In the 5GCN, for example, the Access and Mobility Management Function (AMF), the User Plane Function (UPF), the Session Management Function (SMF), the Policy Control Function (PCF), the Unified Data Management (UDM), and the like are deployed. Here, the 5GCN may be referred to as a 5GC.

The core network_A, and/or the core network_B, an apparatus included in the core network_A, and/or an apparatus included in the core network_B may hereinafter be referred to as a core network, a core network apparatus or an intra-core network apparatus.

The core network (the core network_A and/or the core network_B) may refer to an IP mobile communication network operated by a mobile communication operator (Mobile Network Operator (MNO)) connecting the access network (the access network_A and/or the access network_B) and the PDN and/or the DN, may refer to a core network for a mobile communication operator that operates and manages the mobile communication system 1, or may be a core network for a virtual mobile communication operator and a virtual mobile communication service provider such as a Mobile Virtual Network Operator (MVNO) and a Mobile Virtual Network Enabler (MVNE).

FIG. 1 illustrates a case that the PDN and the DN are the same; however, the PDN and the DN may be different. The PDN may be a Data Network (DN) that provides communication services for the UE. Note that the DN may be configured as a packet data service network, or may be configured for each service. In addition, the PDN may include a connected communication terminal. Thus, "to be connected to the PDN" may be equivalent to "to be connected to a communication terminal and a server apparatus deployed in the PDN." In addition, "to transmit and/or receive user data to and/or from the PDN" may be equivalent to "to transmit and/or receive user data to and/or from a communication terminal and a server apparatus deployed in the PDN." Note that the PUN may be referred to as a DN, and the DN may be referred to as a PDN.

In the following, at least a part of the access network_A, the core network_A, the PDN, the access network_B, the core network_B, and the DN, and/or one or more apparatuses included in these may be referred to as a network or a network apparatus. In other words, the expression that "the network and/or the network apparatus sends and/or receives a message and/or performs a procedure" means that "at least a part of the access network_A, the core network_A, the PDN, the access network_B, the core network_B, and the DN, and/or one or more apparatuses included in these transmit and/or receive a message and/or perform a procedure."

The UE can connect to the access network. The UE can connect to the core network via the access network. In addition, the UE can connect to the PDN or the DN via the access network and the core network. In other words, the UE can transmit and/or receive (communicate) user data to and/or from the PDN or the DN. In a case that user data is transmitted and/or received, not only Internet Protocol (IP) communication but also non-IP communication may be used.

Here, IP communication refers to data communication using the IP, and data is transmitted and/or received using IP packets. The IP packet includes an IP header and a payload part. In the payload part, data transmitted and/or received by the apparatuses and functions included in the EPS and the apparatuses and functions included in the 5GS may be included. Non-IP communication refers to data communication not using the IP, and data is transmitted and/or received in a form different from the structure of the IP packets. For example, non-IP communication may be data communication implemented through transmission and/or reception of application data not provided with an IP header, or user data transmitted and/or received by the UE may be transmitted and/or received with the provision of another header such as a MAC header and an Ethernet (trade name) frame header.

Apparatuses not illustrated in FIG. 2 may be configured in the access network_A, the core network_A, the access network_B, the core network_B, the PDN_A, and the DN_A. For example, the core network_A and/or the core network_B may include an Authentication Server Function (AUSF) or an Authentication, Authorization, and Accounting (AAA) server (AAA-S).

In this regard, the AUSF is a core network apparatus that includes an authentication function for 3GPP access and non-3GPP access. Specifically, the AUSF is a network function unit for receiving, from the UE, a request for authentication for 3GPP access and/or non-3GPP access and performing the authentication procedure.

The AAA server is an apparatus including an authentication, authorization, and accounting function and connected directly to the AUSF or indirectly to the AUSF via another network apparatus. The AAA server may be a network apparatus in the core network. Note that the AAA server may not be included in the core network_A and/or the core network_B and may be included in the PLMN. In other words, the AAA server may be a core network apparatus or an apparatus located outside the core network. For example, the AAA server may be a server apparatus in the PLMN that is managed by a 3rd Party.

Note that for simplification of illustration, FIG. 2 illustrates, for each apparatus and each function, a single apparatus and a single function but that the mobile communication system 1 may include multiple similar apparatuses and functions. Specifically, the mobile communication system 1 may include multiple apparatuses and functions such as UE_As 10, E-UTRANs 80, MMEs 40, SGWs 35, PGW-Us 30, PGW-Cs 32, PCRFs 60, HSSs 50, 5G ANs 120, AMFs 140, UM 130, SMFs 132, PCFs 160, and/or UDMs 150.

2. CONFIGURATION OF EACH APPARATUS

Next, a configuration of each apparatus (the UE, and/or the access network apparatus, and/or the core network apparatus) used in each embodiment will be described with reference to the drawings. Note that each apparatus may be configured as physical hardware, may be configured as logical (virtual) hardware configured in general-purpose hardware, or may be configured as software. At least a part (including all) of the functions of each apparatus may be configured as physical hardware, logical hardware, or software.

Note that each storage unit (a storage unit_A 340, a storage unit_A 440, a storage unit_B 540, a storage unit_A 640, and a storage unit_B 740) in each apparatus and function to be described later includes, for example, a semiconductor memory, a Solid State Drive (SSD), a Hard Disk Drive (HDD), or the like. Each storage unit can store not only information originally configured at the time of being shipped, but also various pieces of information transmitted and/or received to and/or from apparatuses and functions (for example, the UE, and/or the access network apparatus, and/or the core network apparatus, and/or the PDN, and/or the DN) other than the apparatus and functions of each storage unit. Each storage unit can store identification information, control information, flags, parameters, and the like included in a control message transmitted and/or received in various communication procedures to be described later. Each storage unit may store these pieces of information for each UE. In a case that each storage unit performs interworking between the 5GS and the EPS, each storage unit can store a control message and user data transmitted and/or received to and/or from the apparatuses and functions included in the 5GS and/or the EPS. In this case, not only information transmitted and/or received via the N26 interface but also information transmitted and/or received without using the N26 interface can be stored.

2.1. Apparatus Configuration of UE

Figure 3:
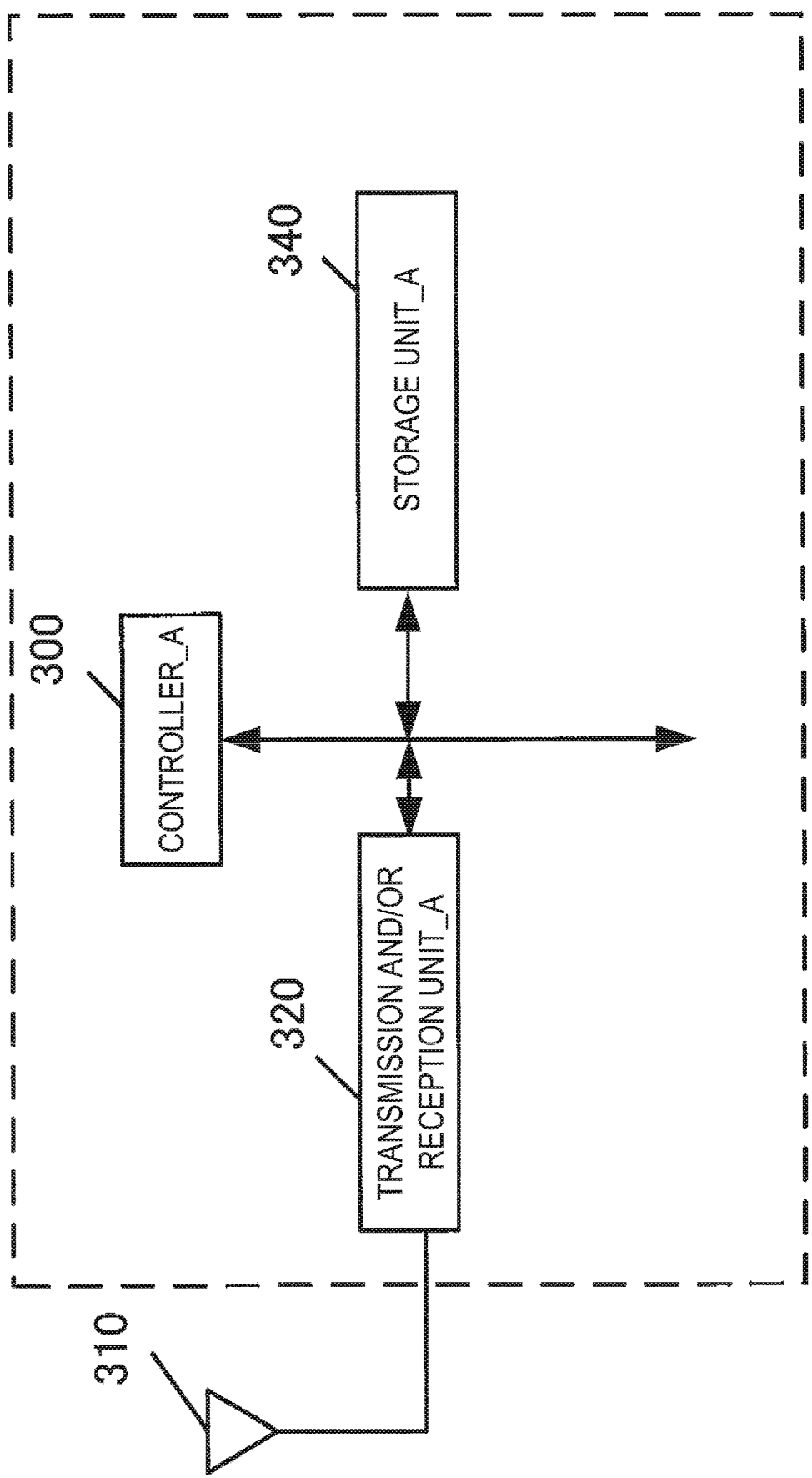
FIG. 3 is a diagram illustrating an apparatus configuration of a UE.

First, an apparatus configuration example of the User Equipment (UE) will be described with reference to FIG. 3. The UE comprises a controller_A 300, an antenna 310, a transmission and/or reception unit_A 320, and a storage unit_A 340. The controller_A 300, the transmission and/or reception unit_A 320, and the storage unit_A 340 are connected via a bus. The transmission and/or reception unit_A 320 connects to the antenna 310.

The controller_A 300 is a function unit that controls the entire operations and functions of the UE. The controller_A 300 reads and performs various programs stored in the storage unit_A 340 as necessary, and thereby implements various types of processing in the UE.

The transmission and/or reception unit_A 320 is a function unit for performing radio communication with the base station apparatus (the eNB or the gNB) in the access network via the antenna. In other words, with the use of the transmission and/or reception unit_A 320, the UE can transmit and/or receive user data and/or control information to and/or from the access network apparatus, and/or the core network apparatus, and/or the PDN, and/or the DN.

Detailed description is given with reference to FIG. 2. With the use of the transmission and/or reception unit_A 320, the UE can communicate with the base station apparatus (eNB) in the E-UTRAN via the LTE-Uu interface. The UE can communicate with the base station apparatus (gNB) in the 5G AN with the use of the transmission and/or reception unit_A 320. The UE can transmit and/or receive a Non-Access-Stratum (NAS) message to and/or from the AMF via the N1 interface with the use of the transmission and/or reception unit_A 320. Note that the N1 interface is a logical interface, and thus communication between the UE and the AMF is actually performed via the 5G AN.

The storage unit_A 340 is a function unit for storing programs, user data, control information, and the like necessary for each operation of the UE.

2.2. Apparatus Configuration of gNB

Figure 4:
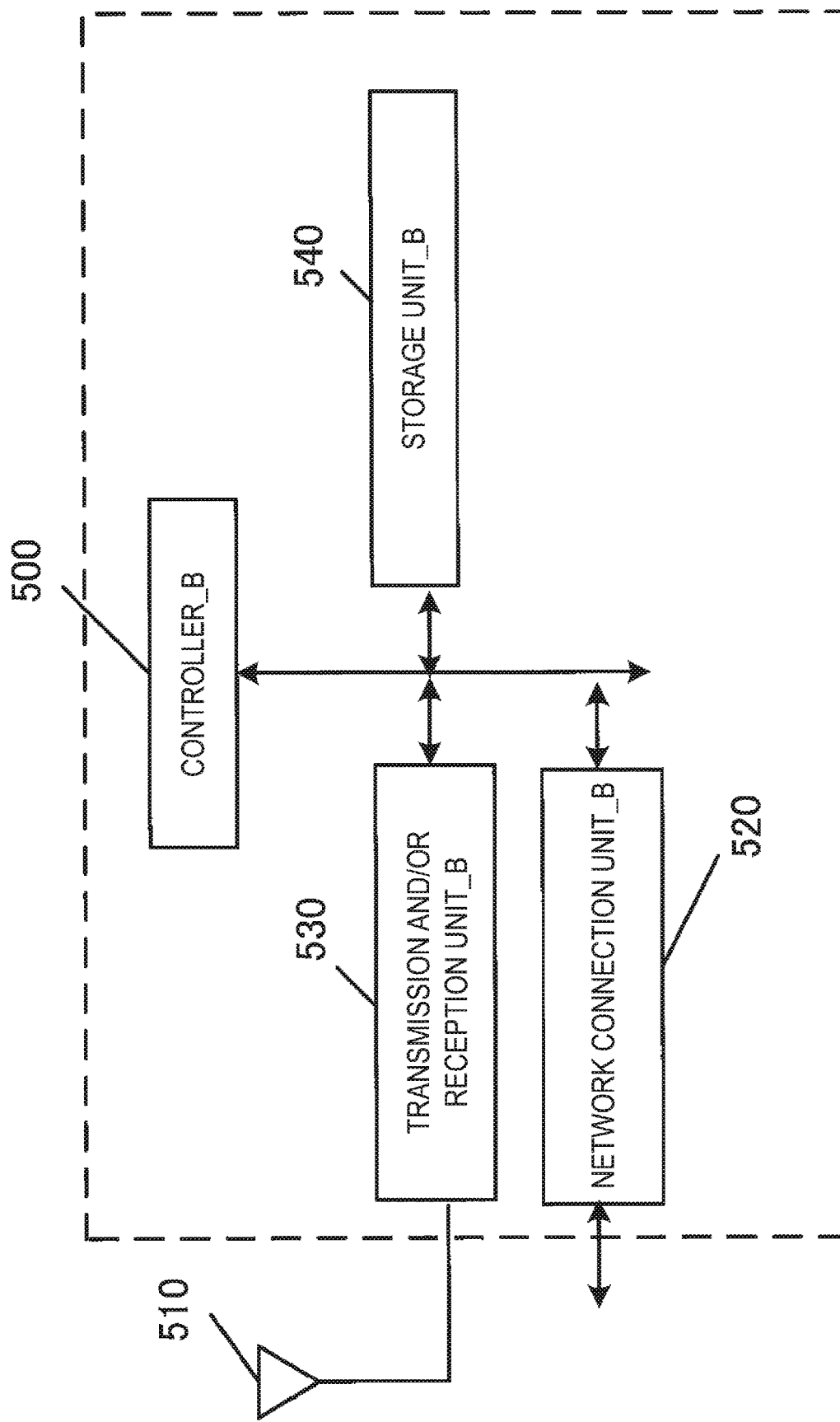
FIG. 4 is a diagram illustrating a configuration of an access network apparatus (gNB) in the 5GS.

Next, an apparatus configuration example of the gNB will be described with reference to FIG. 4. The gNB comprises a controller_B 500, an antenna 510, a network connection unit_B 520, a transmission and/or reception unit_B 530, and a storage unit_B 540. The controller_B 500, the network connection unit_B 520, the transmission and/or reception unit_B 530, and the storage unit_B 540 are connected via a bus. The transmission and/or reception unit_B 530 connects to the antenna 510.

The controller_B 500 is a function unit that controls the entire operations and functions of the gNB. The controller_B 500 reads and performs various programs stored in the storage unit_B 540 as necessary, and thereby implements various types of processing in the gNB.

The network connection unit_B 520 is a function unit for the gNB to communicate with the AMF and/or the UPF. In other words, with the use of the network connection unit_B 520, the gNB can transmit and/or receive user data and/or control information to and/or from the AMF and/or the UPF.

The transmission and/or reception unit_B 530 is a function unit for performing radio communication with the UE via the antenna 510. In other words, with the use of the transmission and/or reception unit_B 530, the gNB can transmit and/or receive user data and/or control information to and/or from the UE.

Detailed description is given with reference to FIG. 2. With the use of the network connection unit_B 520, the gNB in the 5G AN can communicate with the AMF via the N2 interface and can communicate with the UPF via the N3 interface. The gNB can communicate with the UE with the use of the transmission and/or reception unit_B 530.

The storage unit_B 540 is a function unit for storing programs, user data, control information, and the like necessary for each operation of the gNB.

2.3. Apparatus Configuration of AMF

Figure 5:
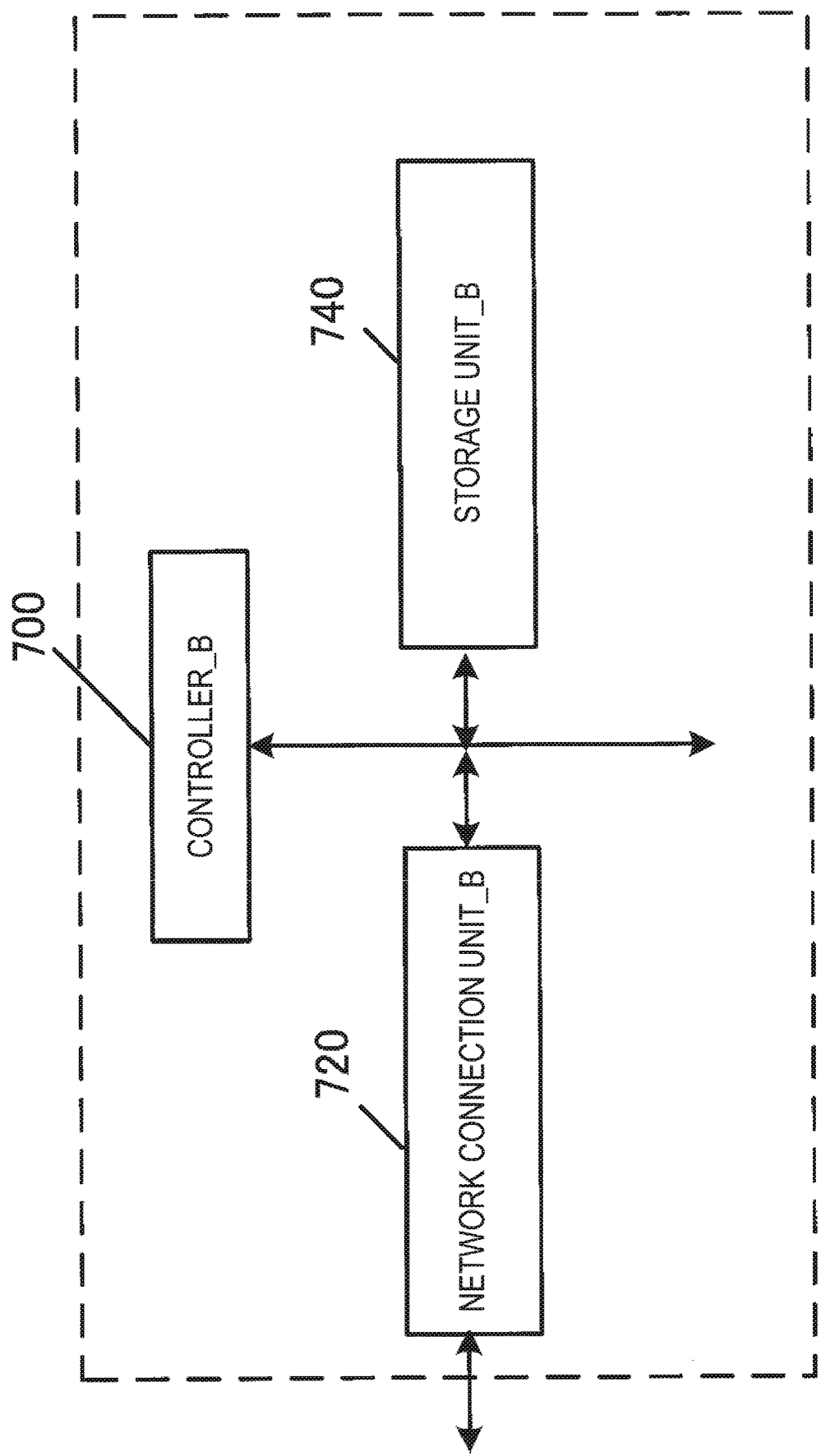
FIG. 5 is a diagram illustrating a configuration of a core network apparatus (AMF/SMF/UPF) in the 5GS.

Next, an apparatus configuration example of the AMF will be described with reference to FIG. 5. The AMF comprises a controller_B 700, a network connection unit_B 720, and a storage unit_B 740, The controller_B 700, the network connection unit_B 720, and the storage unit_B 740 are connected via a bus. The AMF may be a node that handles the control plane.

The controller_B 700 is a function unit that controls the entire operations and functions of the AMF. The controller_B 700 reads and performs various programs stored in the storage unit_B 740 as necessary, and thereby implements various types of processing in the AMF.

The network connection unit_B 720 is a function unit for the AMF to connect to the base station apparatus (gNB), and/or the SME, and/or the PCF, and/or the UDM, and/or the SCEF in the 5G AN. In other words, with the use of the network connection unit_B 720, the AMF can transmit and/or receive user data and/or control information to and/or from the base station apparatus (gNB), and/or the SMF, and/or the PCF, and/or the UDM, and/or the SCEF in the 5G AN.

Detailed description is given with reference to FIG. 2. With the use of the network connection unit_A 620, the AMF in the 5GCN can communicate with the gNB via the N2 interface, can communicate with the UDM via the N8 interface, can communicate with the SMF via the N11 interface, and can communicate with the PCF via the N15 interface. The AMF can transmit and/or receive a NAS message to and/or from the UE via the N1 interface with the use of the network connection unit_A 620. Note that the N1 interface is a logical interface, and thus communication between the UE and the AMF is actually performed via the 5G AN. In a case that the AMF supports the N26 interface, the AMF can communicate with the MME via the N26 interface with the use of the network connection unit_A 620.

The storage unit_B 740 is a function unit for storing programs, user data, control information, and the like necessary for each operation of the AMF.

Note that the AMF has a function of exchanging a control message with the RAN using the N2 interface, a function of exchanging a NAS message with the UE using the N1 interface, a function of performing encryption and integrity protection of a NAS message, a Registration management (RM) function, a Connection management (CM) function, a Reachability management function, a Mobility management function for the UE or the like, a function of transferring a Session Management (SM) message between the UE and the SMF, an Access Authentication (Access Authorization) function, a security anchor function (Security Anchor Functionality (SEA)), a Security Context Management (SCM) function, a function of supporting the N2 interface for a Non-3GPP Interworking Function (N3IWF), a function of supporting transmission and/or reception of a NAS signal with the UE via the N3IWF, a function of authenticating the UE connected via the N3IWF, and the like.

In registration management, an RM state for each UE is managed. The RM state may be synchronized between the UE and the AMF. The RM state includes a deregistered state (RM-DEREGISTERED state) and a registered state (RM-REGISTERED state). In the RM-DEREGISTERED state, the UE is not registered in the network, and thus the AMF is in a state of being unable to reach the UE, because a UE context in the AMF does not have valid location information and routing information for the UE. In the RM-REGISTERED state, the UE is registered in the network, and thus the UE can receive a service that requires registration in the network. Note that the RM state may be referred to as a 5GMM state. In this case, the RM-DEREGISTERED state may be referred to as a 5GMM-DEREGISTERED state, and the RM-REGISTERED state may be referred to as a 5GMM-REGISTERED state.

In other words, 5GMM-REGISTERED may be a state in which each apparatus establishes a 5GMM context, or may be a state in which each apparatus establishes a PDU session context. Note that, in a case that each apparatus is 5GMM-REGISTERED, the UE_A 10 may start transmission and/or reception of user data and a control message, or may respond to paging. In addition, note that, in a case that each apparatus is 5GMM-REGISTERED, the UE_A 10 may perform a registration procedure other than a registration procedure for initial registration, and/or a service request procedure.

In addition, 5GMM-DEREGISTERED may be a state in which each apparatus does not establish the 5GMM context, may be a state in which the location information of the UE_A 10 is not known to the network, or may be a state in which the network is in a state of being unable to reach the UE_A 10. Note that, in a case that each apparatus is 5GMM-DEREGISTERED, the UE_A 10 may initiate the registration procedure, or may perform the registration procedure to thereby establish the 5GMM context.

In connection management, a CM state for each UE is managed. The CM state may be synchronized between the UE and the AMF. The CM state includes a non-connected state (CM-IDLE state) and a connected state (CM-CONNECTED state). In the CM-IDLE state, the UE is in the RM-REGISTERED state, but does not have NAS signaling connection established with the AME via the N1 interface. In the CM-IDLE state, the UE does not have connection of the N2 interface (N2 connection) and connection of the N3 interface (N3 connection). In contrast, in the CM-CONNECTED state, the UE has NAS signaling connection established with the AMF via the N1 interface. In the CM-CONNECTED state, the UE may have connection of the N2 interface (N2 connection) and/or connection of the N3 interface (N3 connection).

In addition, in connection management, management may be performed separately for the CM state in 3GPP access and the CM state in non-3GPP access. In this case, the CM state in 3GPP access may include a non-connected state in 3GPP access (CM-IDLE state over 3GPP access) and a connected state in 3GPP access (CM-CONNECTED state over 3GPP access). In addition, the CM state in non-3GPP access may include a non-connected state in non-3GPP access (CM-IDLE state over non-3GPP access) and a connected state in non-3GPP access (CM-CONNECTED state over non-3GPP access). Note that the non-connected state may be referred to as an idle mode, and a connected state mode may be referred to as a connected mode.

Note that the CM state may be referred to as a 5GMM mode. In this case, the non-connected state may be referred to as a 5GMM non-connected mode (5GMM-IDLE mode), and the connected state may be referred to as a 5GMM connected mode (5GMM-CONNECTED mode). In addition, the non-connected state in 3GPP access may be referred to as a 5GMM non-connected mode in 3GPP access (5GMM-IDLE mode over 3GPP access), and the connected state in 3GPP access may be referred to as a 5GMM connected mode in 3GPP access (5GMM-CONNECTED mode over 3GPP access). In addition, the non-connected state in non-3GPP access may be referred to as a 5GMM non-connected mode in non-3GPP access (5GMM-IDLE mode over non-3GPP access), and the connected state in non-3GPP access may be referred to as a 5GMM connected mode in non-3GPP access (5GMM-CONNECTED mode over non-3GPP access). Note that the 5GMM non-connected mode may be referred to as an idle mode, and the 5GMM connected mode may be referred to as a connected mode.

One or more AMFs may be deployed in the core network_B. The AMF may be an NF that manages one or more Network Slice Instances (NSIs). The AMF may be a common CP function (Common Control Plane Network Function (CPNF) (CCNF)) shared among multiple NSIs.

Note that, in a case that the UE connects to the 5GS via non-3GPP access, the N3IWF is an apparatus deployed and/or a function allocated between non-3GPP access and the 5GCN.

2.4. Apparatus Configuration of SMF

Next, an apparatus configuration example of the SMF will be described with reference to FIG. 5. The SMF includes a controller_B 700, a network connection unit_B 720, and a storage unit_B 740. The controller_B 700, the network connection unit_B 720, and the storage unit_B 740 are connected via a bus. The SMF may be a node that handles the control plane.

The controller_B 700 is a function unit that controls the entire operations and functions of the SMF. The controller_B 700 reads and performs various programs stored in the storage unit_B 740 as necessary, and thereby implements various types of processing in the SMF.

The network connection unit_B 720 is a function unit for the SMF to connect to the AMF, and/or the UPF, and/or the PCF, and/or the UDM. In other words, with the use of the network connection unit_B 720, the SMF can transmit and/or receive user data and/or control information to and/or from the AMF, and/or the UPF, and/or the PCF, and/or the UDM.

Detailed description is given with reference to FIG. 2. With the use of the network connection unit_A 620, the SMF in the 5GCN can communicate with the AMF via the N11 interface, can communicate with the UPF via the N4 interface, can communicate with the PCF via the N7 interface, and can communicate with the UDM via the N10 interface.

The storage unit_B 740 is a function unit for storing programs, user data, control information, and the like necessary for each operation of the SMF.

The SMF includes a session management function for establishment, modification, release, and the like of a PDU session, a function for IP address allocation to the UE and management of the allocation, a function for UPF selection and control, a UPF configuration function for routing traffic to an appropriate destination (transmission destination), a function for transmitting and/or receiving an SM portion of the NAS message, a function for notifying arrival of downlink data (downlink data notification), a function for providing SM information specific to the AN (for each AN) and that is transmitted to the AN via the AMF through the N2 interface, a function for determining a Session and Service Continuity mode (SSC mode) for a session, a roaming function, and the like.

2.5. Apparatus Configuration of UPF

Next, an apparatus configuration example of the UPF will be described with reference to FIG. 5. The UPF includes a controller_B 700, a network connection unit_B 720, and a storage unit_B 740. The controller_B 700, the network connection unit_B 720, and the storage unit_B 740 are connected via a bus. The UPF may be a node that handles the control plane.

The controller_B 700 is a function unit that controls the entire operations and functions of the UPF. The controller_B 700 reads and performs various programs stored in the storage unit_B 740 as necessary, and thereby implements various types of processing in the UPF.

The network connection unit_B 720 is a function unit for the UPF to connect to the base station apparatus (gNB), and/or the SMF, and/or the DN in the 5G AN. In other words, with the use of the network connection unit_B 720, the UPF can transmit and/or receive user data and/or control information to and/or from the base station apparatus (gNB), and/or the SMF, and/or the DN in the 5G AN.

Detailed description is given with reference to FIG. 2. With the use of the network connection unit_A 620, the UPF in the 5GCN can communicate with the gNB via the N3 interface, can communicate with the SMF via the N4 interface, can communicate with the DN via the N6 interface, and can communicate with the another UPF via the N9 interface.

The storage unit_B 740 is a function unit for storing programs, user data, control information, and the like necessary for each operation of the UPF.

The UPF has a function as an anchor point for intra-RAT mobility or inter-RAT mobility, a function as an external PDU session point to be mutually connected with the DN (that is, a function of transferring user data as a gateway between the DN and the core network_B), a function of routing and transferring packets, an Uplink Classifier (UL CL) function of supporting routing of multiple traffic flows for one DN, a Branching point function of supporting a multi-horned PDU session, a Quality of Service (QoS) processing function for the user plane, a function of verifying uplink traffic, a function of triggering buffering of downlink packets and Downlink Data Notification, and the like.

The UPF may be a gateway for IP communication and/or non-IP communication. The UPF may have a function of transferring IP communication, or may not have a function of converting non-IP communication and IP communication. In addition, multiple deployed gateways may be gateways for connecting the core network_B and a single DN. Note that the UPF may have connectivity with another NF, and may connect to each apparatus via another NF.

Note that the user plane refers to user data that is transmitted and/or received between the UE and the network. The user plane may be transmitted and/or received using a PDN connection or a PDU session. In addition, in a case of the EPS, the user plane may be transmitted and/or received using the LTE-Uu interface, and/or the S1-U interface, and/or the S5 interface, and/or the S8 interface, and/or the SGi interface. In addition, in a case of the 5GS, the user plane may be transmitted and/or received via the interface between the UE and the NG RAN, and/or the N3 interface, and/or the N9 interface, and/or the N6 interface. The user plane may be hereinafter referred to as a U-Plane.

In addition, the control plane refers to a control message that is transmitted and/or received in order to perform communication control of the UE or the like. The control plane may be transmitted and/or received using Non-Access-Stratum (NAS) signaling connection between the UE and the MME. In addition, in a case of the EPS, the control plane may be transmitted and/or received using the LTE-Uu interface and the S1-MIME interface. In addition, in a case of the 5GS, the control plane may be transmitted and/or received using the interface between the UE and the NG RAN and the N2 interface. The control plane may be hereinafter referred to as a control plane, or may be hereinafter referred to as a C-Plane.

In addition, the User Plane (U-Plane (UP)) may be a communication path for transmitting and/or receiving user data, and may include multiple bearers. In addition, the Control Plane (C-Plane (CP)) may be a communication path for transmitting and/or receiving a control message, and may include multiple bearers.

2.6. Description of Other Apparatuses and/or Functions

Next, other apparatuses and/or functions will be described.

A network refers to at least a part of the access network_B, the core network_B, and the DN. One or more apparatuses included in at least a part of the access network_B, the core network_B, and the DN may be referred to as a network or a network apparatus. In other words, "a network sends and/or receives a message and/or performs processing" may mean "an apparatus (a network apparatus and/or a control apparatus) in the network sends and/or receives the message and/or performs the processing." Conversely, "an apparatus in a network sends and/or receives a message and/or performs processing" may mean "the network sends and/or receives the message and/or performs the processing."

A session management (SM) message (also referred to as a Non-Access-Stratum (NAS) SM message) may be a NAS message used in a procedure for SM, or may be a control message transmitted and/or received between the UE_A 10 and the SMF_A 230 via the AMF_A 240. In addition, the SM message may include a PDU session establishment request message, a PDU session establishment accept message, a PDU session complete message, a PDU session reject message, a PDU session modification request message, a PDU session modification accept message, a PDU session modification response message, and the like. The procedure for SM may include a PDU session establishment procedure.

A Mobility Management (MM) message (also referred to as a NAS MM message) may be a NAS message used in a procedure for MM and may be a control message transmitted and/or received between the UE_A 10 and the SMF_A 230 via the AMF_A 240. Furthermore, the MM message may include a registration request message, a registration accept message, a registration reject message, a deregistration request message, a registration cancel accept message, a UE configuration update request message, a UE configuration update accept message, and the like. The procedure for MM may include a registration procedure, a deregistration procedure, a UE configuration update procedure, and an authentication and authorization procedure.

A 5G System (5GS) service may be a connection service provided using the core network_B 190. In addition, the 5GS service may be a service different from an EPS service, or may be a service similar to the EPS service.

A Packet Data Network (PDN) type indicates a type of PDN connection, and includes IPv4, IPv6, IPv4v6, and non-IP. In a case that IPv4 is specified, it is indicated that transmission and/or reception of data is performed using IPv4. In a case that IPv6 is specified, it is indicated that transmission and/or reception of data is performed using IPv6. In a case that IPv4v6 is specified, it is indicated that transmission and/or reception of data is performed using IPv4 or IPv6. In a case that non-IP is specified, it is indicated that communication is performed using a communication method other than the IP, not communication using the IP.

A Protocol Data Unit/Packet Data Unit (PDU) session can be defined as a relationship between the DN that provides a PDU connectivity service and the UE; however, the PDU session may be connectivity established between the UE and an external gateway. In the 5GS, the UE establishes a PDU session via the access network_B and the core network_B, and can thereby perform transmission and/or reception of user data to and/or from the DN by using the PDU session. Here, the external gateway may be a UPF, an SCEF, or the like. The UE can perform transmission and/or reception of user data to and/or from an apparatus deployed in the DN, such as an application server, by using a PDU session.

Note that each apparatus (the UE, and/or the access network apparatus, and/or the core network apparatus) may associate one or more pieces of identification information with PDU session(s) for management. Note that these pieces of identification information may include one or more of a DNN, a QoS rule, a PDU session type, application identification information, NSI identification information, access network identification information, and an SSC mode, and may further include other pieces of information. In addition, in a case that multiple PDU sessions are established, pieces of identification information associated with the PDU sessions may have the same or different contents.

The Data Network Name (DNN) may be identification information for identifying the core network and/or an external network such as the DN. In addition, the DNN can also be used as information for selecting a gateway such as the PGW_A 30/UPF_A 235 connecting the core network_B 190. In addition, the DNN may correspond to an Access Point Name (APN).

A Protocol Data Unit/Packet Data Unit (PDU) session type indicates a type of PDU session, and includes IPv4, IPv6, Ethernet, and Unstructured. In a case that IPv4 is specified, it is indicated that transmission and/or reception of data is performed using IPv4. In a case that IPv6 is specified, it is indicated that transmission and/or reception of data is performed using IPv6. In a case that Ethernet is specified, it is indicated that transmission and/or reception of an Ethernet frame is performed. Alternatively, Ethernet may indicate that communication using the IP is not performed. In a case that Unstructured is specified, it is indicated that data is transmitted and/or received to and/or from an application server in the DN or the like by using Point-to-Point (P2P) tunneling technique. For the P2P tunneling technique, for example, UDP/IP encapsulation technique may be used. Note that the PDU session type may include the IP, in addition to the above. The IP can be specified in a case that the UE can use both of IPv4 and IPv6.

A network slice (NS) is a logical network that provides specific network capability and network characteristics. The UE and/or the network can support the network slice (NW slice (NS)) in the 5GS.

A network slice instance (NSI) includes a set of an instance (entity) of a network function (NF) and necessary resources, and forms a network slice to be allocated. Here, the NF is a processing function in a network, and is adopted or defined in 3GPP. The NSI is an entity of one or more NSs configured in the core network_B. The NSI may include a virtual Network Function (NF) generated using a Network Slice Template (NST). Here, the NST is associated with a resource request for provision of a requested communication service and capability, and is a logical expression of one or more NFs. In other words, the NSI may be a set of multiple NFs in the core network_B 190, The NSI may be a logical network configured for classifying user data to be delivered depending on a service or the like. In the NS, one or more NFs may be configured. The NF configured in the NS may or may not be an apparatus shared with another NS. The UE and/or the apparatus in the network can be allocated to one or more NSs, based on an NSSAI, and/or an S-NSSAI, and/or a UE usage type, and/or registration information such as one or more NSI IDs, and/or an APN. Note that the UE usage type is a parameter value included in registration information of the UE, which is used for identifying the NSI, The UE usage type may be stored in the HSS. The AMF may select the SMF and the UPF, based on the UE usage type.

The Single Network Slice Selection Assistance Information (S-NSSAI) is information for identifying the NS. The S-NSSAI may include only a Slice/Service type (SST), or may include both of an SST and a Slice Differentiator (SD). Here, the SST is information indicating operation of the NS expected in terms of functions and services. The SD may be information for interpolating an SST in a case of selecting one NSI out of multiple NSIs indicated by the SST. The S-NSSAI may be information specific to each PLMN, or may be information of standards common to PLMNs. The network may store one or more S-NSSAIs in the registration information of the UE as default S-NSSAI(s), Note that, in a case that the S-NSSAI is a default S-NSSAI, and the UE does not transmit to a network a valid S-NSSAI in a registration request message, the network may provide an NS related to the UE.

The Network Slice Selection Assistance Information (NSSAI) is a set of S-NSSAIs. Each S-NSSAI included in the NSSAI is information for assisting the access network or the core network to select the NSI. The UE may store the NSSAI allowed by the network for each PLMN. The NSSAI may be information used for selecting the AMF.

The requested NSSAI is NSSAI provided to the network from the UE during the registration procedure. The requested NSSAI may be allowed NSSAI or configured NSSAI stored by the UE. Specifically, the requested NSSAI may be information indicating a network slice that the UE intends to access. The S-NSSAI included in the requested NSSAI may be represented as requested S-NSSAI. For example, the requested NSSAI is included, for transmission, in a registration request message, an NAS message such as a PDU session establishment request message which is transmitted to the network from the UE, or a Radio Resource Control (RRC) message including the Non-Access-Stratum (NAS) message.

The allowed NSSAI is information indicating that one or multiple network slices are allowed slices for the UE. In other words, the allowed NSSAI is information for identifying a network slice to which the network allows the UE to connect. Each of the UE and the network stores and manages the allowed NSSAI for each access (3GPP access or non-3GPP access) as HE information. The S-NSSAI included in the allowed NSSAI may be represented as allowed S-NSSAI.

The rejected NSSAI is information indicating that one or multiple network slices are not allowed slices for the UE. In other words, the rejected NSSAI is information for identifying a network slice to which the network does not allow the UE to connect. The rejected NSSAI may be information including one or more combinations of the S-NSSAI and the cause value. Note that the cause value is information indicating the cause of rejection of the corresponding S-NSSAI by the network. The UE and the network each store and manage the rejected NSSAI as UE information. Furthermore, the rejected NSSAI may be included in the NAS message such as the registration accept message, the configuration update command, or the registration reject message which is transmitted from the network to the UE, or in the RRC message including the NAS message. The S-NSSAI included in the rejected NSSAI may be represented as rejected S-NSSAI.

A tracking area is a single or multiple areas that can be expressed using the location information of the UE_A 10 managed by the core network. The tracking area may include multiple cells. In addition, the tracking area may be an area in which a control message such as paging is broadcast, or may be an area in which the UE_A 10 can move without performing a handover procedure. In addition, the tracking area may be a routing area, or may be a location area. The tracking area may be any area as long as the area is similar to these. The tracking area may be hereinafter a Tracking Area (TA).

A TA list is a list including one or multiple TAs allocated to the UE_A 10 by network. Note that while the UE_A 10 is moving within one or multiple TAs included in the TA list, the UE_A 10 may be able to move without performing a tracking area update procedure. In other words, for the UE_A 10, the TA list may be an information group indicating an area in which the UE_A 10 can move without performing the tracking area update procedure. Note that the TA list may be referred to as a TAI list including one or multiple Tracking area identities (TAIs) and that the TAI list may hereinafter also refer to a TA list.

The UE ID is information for identifying the UE. Specifically, for example, the UE ID may be a SUbscription Concealed Identifier (SUCI), or SUbscription Permanent Identifier (SUPI), or a Globally Unique Temporary Identifier (GUTI), or an International Mobile Subscriber Identity (IMEI), or an IMEI Software Version (IMEISV), or a Temporary Mobile Subscriber Identity (TMSI). Alternatively, the UE ID may be other information configured in an application or a network. Furthermore, the UE ID may be information for identifying the user.

Next, the identification information in the present embodiment will be described.

First identification information may be information indicating that the UE supports the Network Slice-Specific Authentication and Authorization function. Alternatively, the first identification information may be information indicating whether the Network Slice-Specific Authentication and Authorization function is supported. The first identification information may be 5G MM capability information. The first identification information may be information indicating that the UE can store first rejected NSSAI and/or second rejected NSSAI.

Second identification information is information for identifying a slice requested by the UE. Specifically, the second identification information may be requested NSSAI, and may include one or multiple pieces of S-NSSAI. The S-NSSAI included in the second identification information may be the S-NSSAI included in the Configured NSSAI stored by the UE or the S-NSSAI included in the Allowed NSSAI. Furthermore, the UE does not include, in the second identification information, the S-NSSAI included in the rejected NSSAI stored by the UE.

Specifically, in a case that the UE stores the rejected NSSAI associated with the PLMN to which the second identification information is transmitted, the UE determines whether the S-NSSAI is included in the second identification information in accordance with the cause value associated with each piece of S-NSSAI included in the rejected NSSAI. For example, the UE does not include, in the second identification information, the S-NSSAI associated with the cause value indicating a pending state for Network Slice-Specific Authentication and Authorization.

Third identification information is information indicating a user ID and/or a UE ID used in the Network Slice-Specific Authentication and Authorization for the slice requested by the UE. Specifically, the third identification information may be the user ID and/or the UE ID for the Network Slice-Specific Authentication and Authorization associated with the S-NSSAI, or may be a GPSI. The third identification information may be linked with the second identification information.

11th identification information is information indicating that the core network and/or the core network apparatus supports the Network Slice-Specific Authentication and Authorization function. The 11th identification information may be 5GMM NW capability information. The 11th identification information may be information notifying that the core network is ready to perform the Network Slice-Specific Authentication and Authorization procedure on the UE, based on the Network Slice-Specific Authentication and Authorization function.

12th identification information is information for identifying a slice allowed by the core network. Specifically, the 12th identification information may be Allowed NSSAI, and may include one or more pieces of S-NSSAI. The 12th identification information may be information for each access. In a case that the core network stores no allowed NSSAI for the UE and may be assigned allowed NSSAI in the future, the 12th identification information may be empty information.

13th identification information is information for identifying a slice to which access is rejected by the core network, in other words, information for identifying a slice not allowed by the core network. Specifically, the 13th identification information may be information including one or more pieces of S-NSSAI and cause values linked with the respective pieces of S-NSSAI. The 13th identification information may include one or more pieces of 14th identification information. The cause values included in the 13th identification information may be information indicated in 15th and 16th. The cause values may be other information.

The 14th identification information may be S-NSSAI that identifies a slice to which is rejected by the core network and that is associated with a cause value indicating the pending state for the Network Slice-Specific Authentication and Authorization, may be S-NSSAI that identifies a slice to which is rejected by the core network and that is associated with a cause value indicating a failure in the Network Slice-Specific Authentication and Authorization, or may be S-NSSAI that identifies a slice to which is rejected by the core network and that is associated with any other cause value.

The 14th identification information may be associated with the 15th identification information or the 16th identification information. Furthermore, the 14th identification information may be included in the 13th identification information.

The 15th identification information is identification information and/or a cause value indicating that performance of the registration request procedure requesting the S-NSSAI associated with the 15th identification information being inhibited and being pending is indicated to the UE until the Network Slice-Specific Authentication and Authorization is complete. Specifically, the 15th identification information is information causing to enter a state in which the registration request procedure using the S-NSSAI associated with the 15th identification information is prevented from being initiated by the UE. In other words, the 15th identification information is information indicating that the associated S-NSSAI is prevented from being requested by the UE until the Network Slice-Specific Authentication and Authorization is complete.

The 15th identification information may be associated with the 14th identification information. Furthermore, the 15th identification information may be included in the 13th identification information.

The 16th identification information is information indicating that the Network Slice-Specific Authentication and Authorization has resulted in a failure, and identification information and/or a cause value indicating that the corresponding S-NSSAI has been rejected due to the failure. Specifically, the 16th identification information is information notifying that the S-NSSAI associated with the 16th identification information is in a state of not being allowed for the UE. The 16th identification information may be associated with the 14th identification information. Furthermore, the 16th identification information may be included in the thirteenth identification information.

17th identification information is the value of a timer indicating a pending time for the Network Slice-Specific Authentication and Authorization. In other words, the 17th identification information may be information indicating the start of counting of the timer using the timer value indicated by the 17th identification information. The 17th identification information may be associated with the 15th identification information or may be transmitted and/or received in combination with the 15th identification information as one piece of information.

18th identification information is information indicating that the AMF with which the UE is registered has changed from the last registration destination AMF. The 18th identification information may be a flag or identification information. The 18th identification information may be information for identifying the AMF, for example, a Globally Unique Temporary Identifier (GUTI), or an AMF Region ID, an AMF Set ID, or an AMF Pointer included in the GUTI. The 18th identification information may be a registration area.

19th identification information may be information indicating whether to delete the first rejected NSSAI stored by the UE. Alternatively, the 19th identification information may be information indicating that the UE is to delete the first rejected NSSAI. Additionally or alternatively, the 19th identification information may be information indicating whether to delete the second rejected NSSAI stored by the UE. Alternatively, the 19th identification information may be information indicating that the UE is to delete the second rejected NSSAI.

The 19th identification may be information including one or multiple pieces of S-NSSAI for indicating to the UE deletion from the first rejected NSSAI or the second rejected NSSAI. Specifically, the 19th identification information may be one or multiple pieces of S-NSSAI that the NW requests the UE to delete in a case that the UE stores the S-NSSAI as the rejected NSSAI. The 19th identification information may be the same as the 18th identification information, or may be the 13th identification information or the 14th identification information.

21st identification information is information for identifying an allowed slice for the UE that is allowed by the network. The 21st identification information may be allowed NSSAI. The 21st identification information may be newly assigned allowed NSSAI. The 21st identification information may include the S-NSSAI included in the rejected NSSAI due to the pending state resulting from the Network Slice-Specific Authentication and Authorization.

22nd second identification information may be information for identifying a slice to which is rejected by the network, or in other words, information for identifying a slice not allowed by the network. The 22nd identification information may be rejected NSSAI. Specifically, the 22nd identification information may be information including one or multiple pieces of S-NSSAI and cause values associated with the respective pieces of S-NSSAI. The 22nd identification information may include one or multiple 24th identification information. The cause value included in the 22nd identification information may be the 24th identification information. The cause value included in the 22nd identification information may be other information.

23rd identification information may be S-NSSAI for identifying a slice to which access is rejected by the core network due to a failure in the Network Slice-Specific Authentication and Authorization or S-NSSAI for identifying a slice to which access is rejected by the core network based on other reasons. The 23rd identification information may be associated with the 24th identification information or any other cause value. Furthermore, the 24th identification information may be included in the 23rd identification information.

The 24th identification information is information indicating that the Network Slice-Specific Authentication and Authorization has resulted in a failure, and identification information and/or a cause value indicating that the corresponding S-NSSAI has been rejected due to the failure. Specifically, the 24th identification information is information for notifying that the S-NSSAI associated with the 24th identification information is in a state of not being allowed for the UE. The 24th identification information may be associated with the 23rd identification information. Furthermore, the 24th identification information may be included in the 22nd identification information.

25th identification information may be information indicating that the UE is requested to initiate the registration procedure again. The 25th identification information may be information indicated in the Configuration update indication information Element (IE).

Note that the apparatuses may exchange and/or acquire various pieces of capability information of the apparatuses and/or various pieces of request information in broadcast information and/or an RRC procedure and/or a procedure for registration with the core network and/or a service request procedure for an emergency call.

Furthermore, each apparatus involved in the present procedure may transmit and/or receive each control message described in the present procedure to transmit and/or receive one or more pieces of identification information included in each control message and store each piece of identification information transmitted and/or received as a context.

For simplicity, a service request procedure and/or a PDU session establishment procedure and/or an IMS registration procedure and/or an IMS emergency call connection procedure may be collectively referred to as emergency call connection processing.

3.1. Description of Procedures Used in Each Embodiment

Next, procedures used in each embodiment will be described. Note that the procedures used in each embodiment include a Registration procedure, a Network Slice-Specific Authentication and Authorization procedure, and a UE configuration update procedure (Generic UE configuration update procedure). Each procedure will be described below.

Note that, in each embodiment, as illustrated in FIG. 2, description will be given by taking an example of a case that the HSS and the UDM, the PCF and the PCRF, the SMF and the PGW-C, and the UPF and the PGW-U are each configured as the same apparatus (that is, the same piece of physical hardware, or the same piece of logical hardware, or the same piece of software). However, the details described in the present embodiment can also be applied to a case that these are configured as different apparatuses (that is, different pieces of physical hardware, or different pieces of logical hardware, or different pieces of software). For example, transmission and/or reception of data may be directly performed among these, data may be transmitted and/or received via the N26 interface between the AMF and the MME, or data may be transmitted and/or received via the UE.

3.2. Registration Procedure

First, the Registration procedure will be described with reference to FIG. 6. The present procedure hereinafter refers to the registration procedure. The registration procedure is a procedure for registration with the access network_B, and/or the core network_B, and/or the DN as initiated by the UE. On the condition that the UE is a state of not being registered with the network, for example, the UE can perform the present procedure at any timing such as the timing at which the UE is turned on. In other words, the UE can initiate the present procedure at any timing on the condition that the UE is in the deregistered state (RM-DEREGISTERED state). Each apparatus (in particular, the UE and the AMF) can enter the registered state (RM-REGISTERED state), based on completion of the registration procedure.

In addition, the registration procedure may be a procedure for updating position registration information of the UE in the network, and/or periodically giving a notification of the state of the UE from the UE to the network, and/or updating a specific parameter related to the UE in the network.

In a case that the UE performs mobility across the TA, the UE may initiate the registration procedure. In other words, in a case that the UE moves to a TA that is different from the TA indicated in the stored TA list, the UE may initiate the registration procedure. Furthermore, the UE may initiate the present procedure in a case that an operating timer expires. In addition, the UE may initiate the registration procedure in a case that a context of each apparatus needs to be updated due to disconnection and deactivation of a PDU session. In addition, in a case that there is a change in capability information and/or a preference related to PDU session establishment of the UE, the UE may initiate the registration procedure. In addition, the UE may periodically initiate the registration procedure. Furthermore, the UE may initiate the registration procedure, based on completion of the UE configuration update procedure, or based on completion of the registration procedure, or based on completion of the PDU session establishment procedure, or based on completion of a PDU session management procedure, or based on information received from the network for each procedure. Note that these are not restrictive, and the UE can perform the registration procedure at any timing.

Note that an initial registration procedure may include a procedure for transitioning from the above-described state in which the UE is not registered with the network to a state in which the UE is registered with the network, and a Registration procedure for mobility and periodic registration update may include a registration procedure performed with the UE registered with the network.

Figure 6:
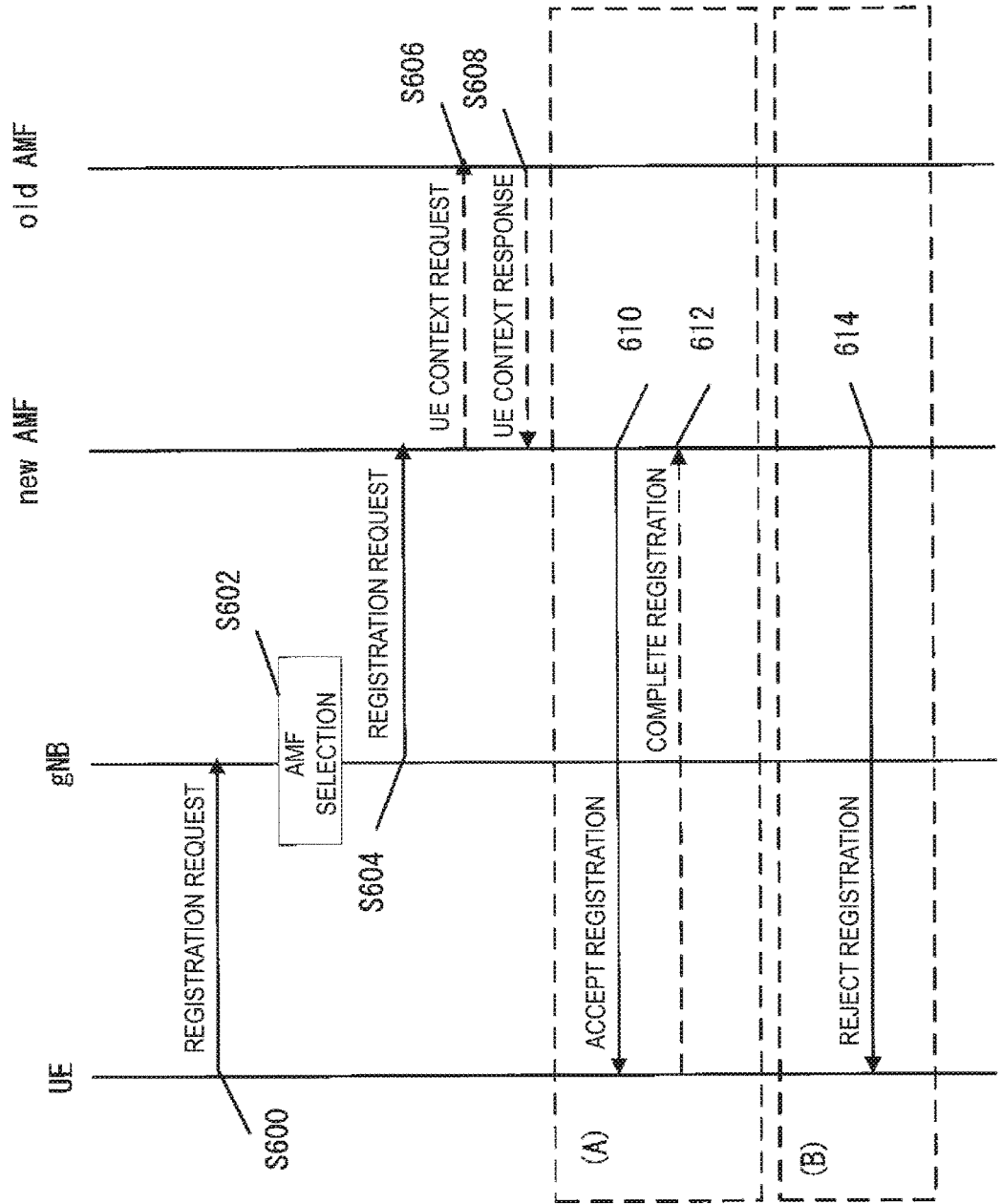
FIG. 6 is a diagram illustrating a registration procedure.

"new AMF" in FIG. 6 indicates the AMF with which the UE is registered by the present procedure, and "old AMF" means the AMF with which the UE has been registered by the procedure preceding the present procedure. It is assumed that in a case that the present procedure does not lead to a change of the AMF, the old AMF, the interface between the old AMF and the new AMF, and the procedure between the old AMF and the new AMF does not occur. In the present embodiment, the reference of the AMF may mean new AMF, old AMF, or both.

First, the UE sends a Registration request message to the new AMF (S600) (S602) (S604), thus initiating the registration procedure. Specifically, the UE sends, to the 5G AN (or the gNB), an RRC message including the registration request message (S600). Note that the registration request message is an NAS message transmitted and/or received on the N1 interface. The RRC message may be a control message transmitted and/or received between the UE and the 5G AN (or the gNB). The NAS message is processed in the NAS layer, and the RRC message is processed in the RRC layer. Note that the NAS layer is a layer higher than the RRC layer.

Here, the UE can transmit at least one or more pieces of identification information out of the first to the third identification information included in the registration request message and/or the RRC message; however, the UE may transmit the one or more pieces of identification information on a control message different from the above, e.g., a control message of a layer (for example, the MAC layer, the RLC layer, or the PDCP layer) lower than the RRC layer. Note that, by transmitting these pieces of identification information, the UE may indicate that the UE supports each function, or may indicate a request of the UE, or may indicate both. In addition, in a case of multiple pieces of identification information transmitted and/or received, two or more pieces of identification information may be configured as one or more pieces of identification information. Note that information indicating the support of each function and information indicating a request for the use of each function may be transmitted and/or received as the same piece of identification information or different pieces of identification information.

Note that the UE may select and determine whether to transmit the first to the third identification information to the network based on capability information of the UE and/or a UE policy and/or the state of the UE and/or user registration information and/or the context held by the UE and/or the like.

In a case that the UE includes the Network Slice-Specific Authentication and Authorization function or requests at least one piece of S-NSSAI for identifying a slice requiring the Network Slice-Specific Authentication and Authorization, the UE may transmit the first identification information. By transmitting the first identification information, the UE may request the network to treat the UE as a UE including the Network Slice-Specific Authentication and Authorization function and request the performance, in the procedures related to the UE, of the authentication and authorization procedure using the Network Slice-Specific Authentication and Authorization function.

In a case that the UE stores the allowed NSSAI for the requested access of the requested PLMN and/or holds the Configured NSSAI, the UE may transmit the second identification information. The UE may select one or more pieces of S-NSSAI 1 from the stored allowed NSSAI and/or the configured NSSAI and include the S-NSSAI in the second identification information for transmission. Furthermore, in a case that the UE stores the rejected NSSAI, the UE may transmit the S-NSSAI included in the rejected NSSAI without including the S-NSSAI in the second identification information.

In a case that the S-NSSAI requested by the UE is information for identifying a slice that requires the Network Slice-Specific Authentication and Authorization and/or that the UE stores identification information (e.g., an Extensible Authentication Protocol (EAP) ID) used for the Network Slice-Specific Authentication and Authorization associated with the S-NSSAI requested by the UE, the UE may transmit the third identification information. By transmitting the third identification information, the UE may request the initiation of the Network Slice-Specific Authentication and Authorization procedure or request the results of the Network Slice-Specific Authentication and Authorization from the network.

The UE may include other than the first to the third identification information in the RRC message including the registration request message and/or the registration request message, and may include, in the RRC message, for example, the UE ID and/or the PLMN ID and/or the AMF identification information for transmission. In this regard, the AMF identification information may be information for identifying the AMF or a collection of AMFs, and may be, for example, a 5G S-Temporary Mobile Subscription Identifier (5G-S-TMSI) or a Globally Unique AMF Identifier (GUAMI).

By transmitting an SM message (for example, the PDU session establishment request message) on the registration request message, or by transmitting an SM message (for example, the PDU session establishment request message) together with the registration request message, the UE may initiate the PDU session establishment procedure during the registration procedure.

In response to receiving the RRC message including the registration request message, the 5G AN (or the gNB) selects the AMF to which the registration request message is to be transferred (S602). Note that the 5G AN (or the gNB) can select the AMF based on one or multiple pieces of identification information included in the registration request message and/or the RRC message including the registration request message. Specifically, the 5G AN (or gNB) may select the new AMF to which the registration request message is transmitted based on at least one piece of identification information of the first to the third identification information.

For example, the 5G AN (or gNB) may select, based on the first identification information, the AMF with the Network Slice-Specific Authentication and Authorization function and/or the AMF with connectivity to a network with the Slice-Specific Authentication and Authorization function.

Additionally or alternatively, the 5G AN (or gNB) may select the AMF based on the second identification information. Specifically, the 5G AN (or gNB) may select the AMF included in a network slice identified by the S-NSSAI included in the second identification information or the AMF with connectivity to the network slice.

Note that the method for selecting the AMF is not limited to those described above, and the 5G AN (or gNB) may select the AMF based on other conditions. The 5G AN (or the gNB) extracts the registration request message from the received RRC message, and transfers the registration request message to the selected AMF (S604). Note that in a case that at least one piece of identification information of the first to the third identification information is included in the RRC message instead of being included in the registration request message, the identification information included in the RRC message may be transferred to the selected AMF together with the registration request message (S604).

In a case that the new AMF receives the registration request message, the new AMF can perform a first condition fulfillment determination. The first condition fulfillment determination is intended to determine whether the network (or the new AMF) accepts the request from the UE. In a case that the first condition fulfillment determination is true, the new AMF initiates the procedure succeeding S606, and performs the procedure (A). On the other hand, in a case that the first condition fulfillment determination is false, the new AMF may perform the procedure (B) while not performing the procedure from S606 to S612.

Alternatively, the new AMF may make the first condition fulfillment determination after receiving a UE context from the old AMF (S608). In this case, in a case that the first condition fulfillment determination is true, the new AMF performs the procedure (A). On the other hand, in a case that the first condition fulfillment determination is false, the new AMF may perform the procedure (B) while not performing the procedure (A).

Note that the first condition fulfillment determination may be performed based on reception of the registration request message, and/or each piece of identification information included in the registration request message, and/or subscriber information, and/or capability information of the network, and/or the operator policy, and/or the state of the network, and/or registration information of a user, and/or a context stored in the AMF, and/or the like.

For example, in a case that the network allows the request from the UE, the first condition fulfillment determination may be true, whereas in a case that the network does not allow the request from the UE, the first condition fulfillment determination may be false. In a case that a destination network with which the UE is to be registered and/or an apparatus in the network supports the function requested by the UE, the first condition fulfillment determination may be true, whereas in a case that the destination network and/or the apparatus does not support the function requested by the UE, the first condition fulfillment determination may be false, in addition, in a case that the transmitted and/or received identification information is allowed, the first condition fulfillment determination may be true, whereas in a case that the transmitted and/or received identification information is not allowed, the first condition fulfillment determination may be false.

In a case that the S-NSSAI included in the requested NSSAI received from the UE is information for identifying a slice requiring the Slice-Specific Authentication and Authorization procedure and that the AMF stores successful results of the Slice-Specific Authentication and Authorization procedure for the S-NSSAI corresponding to the UE, then the first condition fulfillment determination may be true. Alternatively, in a case that the AMF lacks allowed S-NSSAI for the UE and is not scheduled to assign allowed NSSAI to the UE in the future, the first condition fulfillment determination may be false.

First, a case that the first condition fulfillment determination is true will be described. The new AMF performs the procedure in S606 and S608 in a case that the new AMF is different from the AMF indicated in the AMF identification information included in the message received from the UE, and the new AMF does not perform the procedure in S606 and S608 in a case that the new AMF is the same as the AMF indicated in the AMF identification information included in the message received from the UE. In other words, the procedure in S606 and S608 is performed in a case that the present procedure has led to a change of the AMF, and the procedure in S606 and S608 is skipped in a case that the present procedure has not led to a change of the AMF.

A UE context transfer procedure (S606, S608) will be described. The new AMF uses, as the old AMF, the AMF indicated in the AMF identification information to transmit a UE context request message to the old AMF (S606). Based on the UE context request message received, the old AMF sends the UE context to the new AMF. The New AMF generates a UE context based on the UE context received.

In this regard, the UE context transmitted from the new AMF to the old AMF may include the UE ID and the allowed NSSAI. Furthermore, the UE context may include the configured NSSAI and/or the rejected NSSAI. The allowed NSSAI and/or the configured AMF and/or the rejected NSSAI included in the UE context may be linked with information as to whether the notification to the UE is complete.

The UE context may include information of the S-NSSAI requiring the Network Slice-Specific Authentication and Authorization procedure, information indicating completion for the UE of the Network Slice-Specific Authentication and Authorization procedure and successful authentication, and/or information indicating a failure in the authentication.

Now, the procedure (A) of the present procedure will be described. In response to determining the acceptance of the UE request for registration, the new AMF sends the registration accept message to the UE (S610) based on the determination and/or based on reception of the UE context from the old AMF.

The new AMF may include at least one or more pieces of identification information of the 11th to 19th identification information in the registration accept message for transmission. Note that, by transmitting these pieces of identification information and/or the registration accept message, the AMF may indicate that the network supports each function, or may indicate that the request from the UE is accepted, or may indicate that a part of the request from the UE is not accepted, or may indicate a combination of both pieces of information. In addition, in a case of multiple pieces of identification information transmitted and/or received, two or more pieces of identification information may be configured as one or more pieces of identification information. Note that information indicating the support of each function and information indicating a request for the use of each function may be transmitted and/or received as the same piece of identification information or different pieces of identification information.

In response to reception of at least one piece of information of the first to the third identification information from the UE and/or update of the UE configuration information with respect to the last registration procedure, the AMF may transmit at least one piece of information of the 11th to the 19th identification information.

In a case that the AMF receives the first identification information from the UE and/or initiates the Network Slice-Specific Authentication and Authorization procedure, the AMF may transmit the 11th identification information.

In a case that the AMF lacks allowed S-NSSAI for the UE but is scheduled to perform the Network Slice-Specific Authentication and Authorization procedure after completion of the present procedure, the AMF may include empty allowed NSSAI in the 12th identification information for transmission.

Based on reception of the 11th identification information, the UE may recognize that the network includes the Network Slice-Specific Authentication and Authorization function or may store the information that the UE has been registered as a UE including the Network Slice-Specific Authentication and Authorization function.

Based on reception of the 12th identification information, the UE may identify a slice allowed by the network or may store the S-NSSAI included in the 12th identification information as the allowed NSSAI. The UE may then store the allowed NSSAI until the UE receives the 12th identification information. The UE may store the allowed NSSAI until the UE moves out of a registration area. In a case that the UE has already stored the allowed NSSAI, the UE may update the stored information to the allowed NSSAI indicated in the 12th identification information.

Based on reception of the empty 12th identification information, the UE may enter a state in which registration has been allowed but in which establishment of the PDU session has not been allowed. Based on reception of the empty 12th identification information, the UE may store the registration area received as a disallowed area, or may enter a state in which mobility limitation is being imposed.

Based on reception of the 13th identification information, and/or the 14th identification information, and/or the 15th identification information and/or the 16th identification information, the UE may recognize and store a slice to which access is rejected by the network and the cause of the rejection.

For example, in a case that the 13th identification information includes the 14th identification information and the 15th identification information, then based on reception of the 13th identification information, the UE may store the S-NSSAI indicated in the 14th identification information as information for identifying the slice made pending for the Network Slice-Specific Authentication and Authorization. At this time, the UE may store the slice made pending for the Network Slice-Specific Authentication and Authorization as information common to the accesses. Specifically, the UE may store the information that the slice made pending for the Network Slice-Specific Authentication and Authorization is in a state where the access to the slice is rejected for both 3GPP access and non-3GPP access.

For example, in a case that the 13th identification information includes the 14th identification information and the 16th identification information, then based on reception of the 13th identification information, the UE may store the S-NSSAI indicated by the 14th identification information as information for identifying the slice to which access is rejected due to a failure in authentication as a result of the Network Slice-Specific Authentication and Authorization procedure. At this time, the UE may store the slice made pending for the Network Slice-Specific Authentication and Authorization as information common to the accesses. Specifically, the UE may store the information that the slice to which access is rejected due to a failure in authentication as a result of the Network Slice-Specific Authentication and Authorization procedure is in a state where the access to the slice is rejected for both 3GPP access and non-3GPP access. Specifically, the UE may store the information that the slice to which access is rejected due to a failure in authentication as a result of the Network Slice-Specific Authentication and Authorization procedure is in a state where the access to the slice is rejected for both 3GPP access and non-3GPP access.

The UE may similarly store the S-NSSAI associated with other cause values. Note that the method for storing the rejected NSSAI by the UE is not limited to the method described above and that the S-NSSAI may be stored in a state of being associated with the cause value.

The UE may start counting of the timer or start the timer based on reception of the 13th identification information and/or the 14th identification information and/or the 15th identification information and/or the 17th identification information. In this regard, the timer value may be a value stored by the UE in advance or may be a timer value indicated in the 17th identification information.

In a case that the UE receives, from the network during counting of the timer, the configuration update command or the registration accept message including the allowed NSSAI and/or the rejected NSSAI indicating a notification of the results of the Network Slice-Specific Authentication and Authorization for the pending rejected NSSAI, the UE stops the timer.

In a case that the count of the timer expires, in other words, in a case that the UE fails to receive, from the network during counting of the timer, the configuration update command or the registration accept message including the allowed NSSAI and/or the rejected NSSAI indicating a notification of the results of the Network Slice-Specific Authentication and Authorization for the pending rejected NSSAI, then the UE may delete the rejected NSSAI as the slice made pending for the Network Slice-Specific Authentication and Authorization. In other words, the UE may delete the first NSSAI from storage based on the expiration of the timer.

Based on reception of the 18th identification information, the UE may recognize that a change of the AMF has occurred. In a case that the UE has stored the first rejected NSSAI before receiving the registration accept message, the UE may delete the first rejected NSSAI and/or the second rejected NSSAI based on reception of the 18th identification information.

In a case that the 18th identification information is information indicating the registration area, the UE may delete the first rejected NSSAI and/or the second rejected NSSAI in response to a change of the registration area.

The UE may delete the first rejected NSSAI and/or the second rejected NSSAI based on reception of the 19th identification information, Specifically, in a case that the 19th identification information is information indicating deletion of the first rejected NSSAI, the UE may delete the first rejected NSSAI. Additionally or alternatively, in a case that the 19th identification information is information indicating deletion of the second rejected NSSAI, the UE may delete the second rejected. NSSAI.

Note that each type of processing performed by the UE based on reception of each piece of identification information described above may be performed during the present procedure or after completion of the present procedure, or may be performed based on completion of the present procedure after completion of the present procedure.

Note that the AMF may select and determine which piece of identification information of the 11th to the 19th identification information is to be included in the registration accept message, based on each piece of received identification information, and/or subscriber information, and/or capability information of the network, and/or the operator policy, and/or the state of the network, and/or registration information of the user, and/or the context stored in the AMF, and/or the like.

The AMF can either transmit an SM message (for example, the PDU session establishment accept message) on the registration accept message, or transmit an SM message (for example, the PDU session establishment accept message) together with the registration accept message. Note that the transmission method may be performed in a case that the SM message (for example, the PDU session establishment request message) is included in the registration request message. The transmission method may be performed in a case that the SM message (for example, the PDU session establishment request message) is included together with the registration request message. By performing the transmission method as described above, the AMF can indicate that a procedure for SM is accepted in the registration procedure.

By transmitting the registration accept message based on each piece of received identification information, and/or subscriber information, and/or capability information of the network, and/or the operator policy, and/or the state of the network, and/or registration information of a user, and/or a context stored in the AMF, and/or the like, the AMF may indicate that the request from the UE is accepted.

The UE receives the registration accept message via the 5G AN (gNB) (S608). By receiving the registration accept message, the UE can recognize that the request from the UE on the registration request message is accepted, and recognize details of various pieces of identification information included in the registration accept message.

The UE can further transmit the registration complete message to the AMF via the 5G AN (gNB) as a response message to the registration accept message (S610). Note that, in a case that the UE receives the SM message such as the PDU session establishment accept message, the TIE may transmit the SM message such as the PDU session establishment complete message on the registration complete message, or may indicate that the procedure for SM has completed by including the SM message. Here, the registration complete message is a NAS message transmitted and/or received on the N1 interface; however, between the UE and the 5G AN (gNB), the registration complete message is transmitted and/or received on an RRC message.

The AMF receives the registration complete message via the 5G AN (gNB) (S612). Each apparatus completes the procedure (A) in the present procedure and the registration procedure based on the transmission and/or reception of the registration accept message and/or the registration complete message.

Next, a case that the first condition fulfillment determination is false will be described. The AME sends the Registration reject message to the UE via the 5G AN (gNB) as a response message to the registration request message (S614). Here, the registration reject message is a NAS message transmitted and/or received on the N1 interface; however, between the UE and the 5G AN (gNB), the registration reject message is transmitted and/or received on an RRC message.

Note that, by transmitting the registration reject message, the AMF may indicate that the request from the UE on the registration request message is rejected.

Note that each type of processing performed by the UE based on reception of each piece of identification information described above may be performed during the present procedure or after completion of the present procedure, or may be performed based on completion of the present procedure after completion of the present procedure. The UE receives the registration reject message via the 5G AN (gNB). By receiving the registration reject message, the UE can recognize that the request from the UE on the registration request message is rejected, and recognize details of various pieces of identification information included in the registration reject message. In a case that the UE does not receive the registration accept message or the registration reject message even after a prescribed time period has elapsed after transmitting the registration request message, the UE may recognize that the request from the UE is rejected. The apparatuses may complete the registration procedure based on transmission and/or reception of the registration reject message.

Note that the apparatuses may enter or maintain the state in which the UE is registered with the network (RM_REGISTERED state or 5GMM-REGISTERED state), based on the transmission and/or reception of the registration accept message and/or the registration complete message, or may the UE may enter or maintain the state in which the UE is not registered with the network (RM_DEREGISTERED state or 5GMM-DEREGISTERED state), based on the transmission and reception of the registration reject message. The apparatuses may enter each state based on completion of the registration procedure.

In addition, each apparatus may perform processing based on information transmitted and/or received in the registration procedure, based on completion of the registration procedure. For example, in a case that information indicating that a part of the request from the UE is rejected is transmitted and/or received, a reason of rejection of the request from the UE may be recognized. In addition, based on a reason of rejection of the request from the UE, each apparatus may perform the present procedure again, or may perform the registration procedure with respect to the core network_A and another cell.

In addition, based on completion of the registration procedure, the UE may store identification information received together with the registration accept message and/or the registration reject message, or may recognize determination of the network.

Furthermore, the apparatuses may initiate the Network Slice-Specific Authentication and Authorization procedure and the UE configuration update procedure based on completion of the registration procedure. Note that the details of the Network Slice-Specific Authentication and Authorization procedure and the UE configuration update procedure will be described below.

3.3 Network Slice-Specific Authentication and Authorization Procedure

Figure 7:
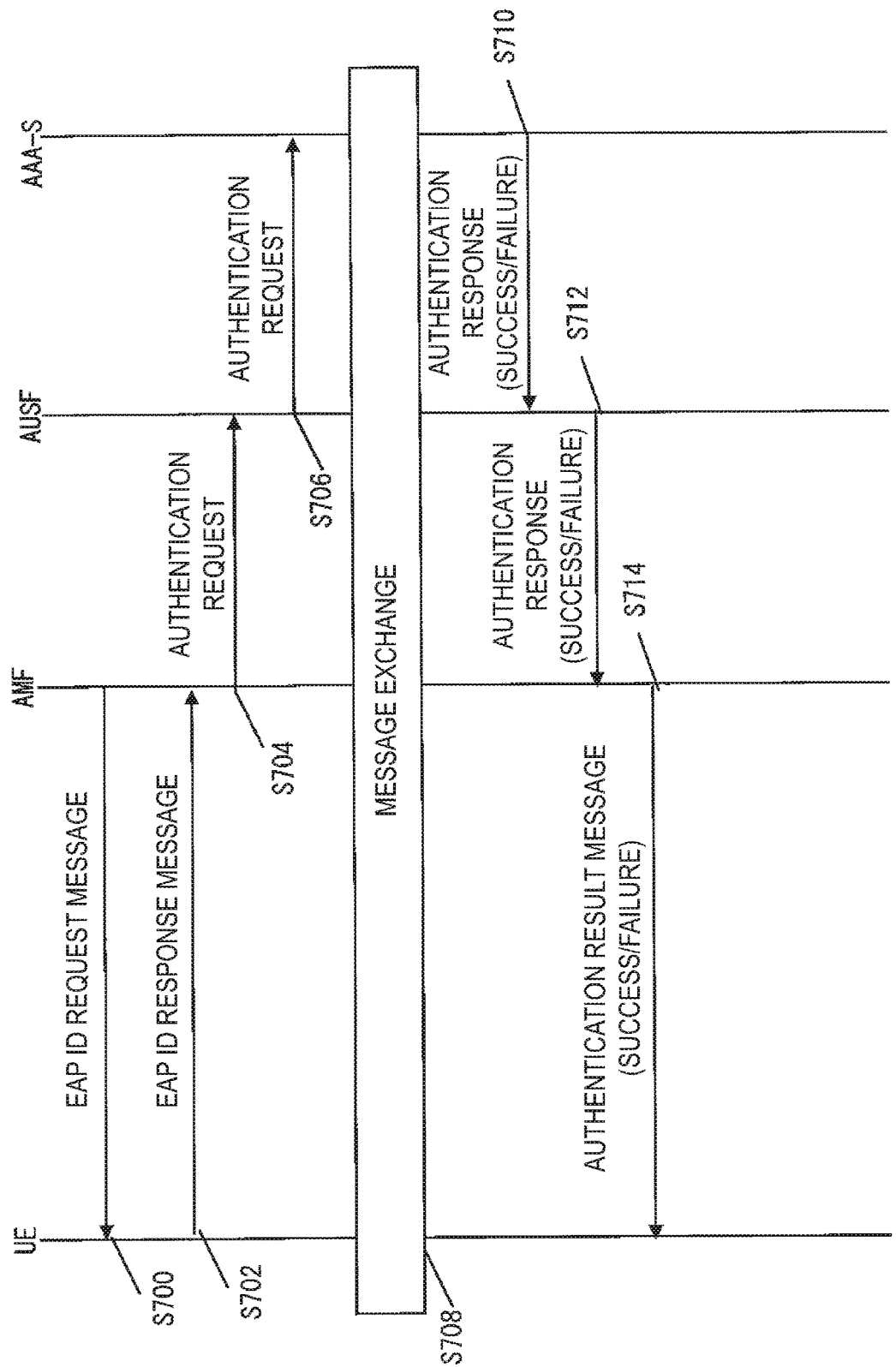
FIG. 7 is a diagram illustrating a Network Slice specific authentication and authorization procedure.

Now, the Network Slice-Specific Authentication and Authorization procedure will be described using FIG. 7. Hereinafter, the Network Slice-Specific Authentication and Authorization procedure is also referred to as the present procedure. The present procedure may be a procedure in which the core network performs, for the UE, authentication and authorization procedure on the slice requiring the Network Slice-Specific Authentication and Authorization procedure.

The present procedure may be initiated by the AMF. For example, the AMF may initiate the present procedure based on reception of the registration request message from the UE. The AMF may initiate the present procedure in a case that the AMF has stored at least one piece of S-NSSAI requested by the UE, as S-NSSAI requiring the Network Slice-Specific Authentication and Authorization procedure and has not stored the results of the Network Slice-Specific Authentication and Authorization for the S-NSSAI.

Alternatively, the AMF may initiate the present procedure based on a request from the AAA-S. For example, with the AMF managing certain S-NSSAI as allowed NSSAI as a result of performance of at least one Network Slice-Specific Authentication and Authorization operation on the certain S-NSSAI, in a case that the AAA-S again requests the performance of the Network Slice-Specific Authentication and Authorization on the S-NSSAI, the AMF may initiate the procedure based on the request from the AAA-S. In this case, the present procedure may be the Network Slice-Specific Authentication and Authorization procedure initiated by the AAA-S.

Hereinafter, the present procedure will be described. The AMF sends an EAP ID request message to the UE via the 5G AN (or gNB or non-3GPP access) (S700). The EAP ID request message may be included in an Authentication request message corresponding to an NAS message, before the Authentication request message is transmitted. The AMF includes one or multiple pieces of S-NSSAI corresponding to the requested EAP ID, in the EAP ID request message or the Authentication request message including the EAP ID request message, before transmitting the EAP ID request message or the Authentication request message.

Based on transmission of the EAP ID request message, the AMF requests, from the UE, one or multiple EAP IDs as identification information of the UE used to perform the Network Slice-Specific Authentication and Authorization on one or multiple pieces of S-NSSAI.

Based on reception of the EAP ID request message and/or reception of the S-NSSAI, the UE sends an EAP ID response message (S702). The EAP ID response message may be included in an Authentication response message corresponding to an NAS message before the Authentication response message is transmitted. The UE includes the S-NSSAI received from the AMF in the EAP ID response message or the authentication request message including the EAP ID response message, before transmitting the EAP ID response message or the authentication request message. The UE includes, in the EAP ID response message including the EAP ID corresponding to identification information of the UE corresponding to the S-NSSAI received from the AMF, before transmitting the EAP ID response message. Note that the UE may include, in the EAP ID response message, multiple EAP IDs and multiple pieces of S-NSSAI, and transmit the EAP ID response message with each EAP ID associated with each piece of S-NSSAI.

Based on response of the EAP ID response messages and/or EAP ID from the LTE, the AMF sends the authentication request message to the AAA-S via the AUSF (S704, S706). The AMF may include, in the authentication request message, the EAP ID response message received from the UE, before transmitting the authentication request message to the AUSF and/or AAA-S, or may include, in the authentication request message, the EAP ID and/or the S-NSSAI included in the EAP ID response message received from the UE, before transmitting the authentication request message to the AUSF and/or the AAA-S.

Note that the authentication request message transmitted from the AMF to the AUSF may be the same as or different from the authentication request message transmitted from the AUSF to the AAA-S. Specifically, the AUSF may transfer, to the AAA-S, the authentication request message received from the AMF or may include, in the authentication request message, the EAP ID and/or the S-NSSAI included in the authentication request message received from the AMF, before transmitting the authentication request message to the AAA-S.

Based on reception of the authentication request message, the AAA-S may initiate a procedure for exchanging, between the UE and the AAA-S, messages required for authentication (S708). Note that EAP messages may be used as messages used in a message exchange procedure between the AAA-S and the UE.

Based on reception of the authentication request message received from the AMF via the AUSF, the AAA-S performs an authentication procedure. The AAA-S sends the authentication response message to the AMF via the AUSF as a response to the authentication request message received from the AMF (S710, S712). The AUSF includes an authentication result and the S-NSSAI in the authentication response message before transmitting the authentication response message. Here, the authentication result may be information indicating a success or a failure.

Based on reception of the authentication response message, the AMF sends an Authentication result message to the UE (S714), The AMF may include, in the authentication response message, the authentication response message or the authentication result and S-NSSAI included in the authentication response message, before transmitting the authentication response message.

The apparatuses may complete the present procedure based on the transmission and/or reception of the authentication result message. In addition, based on completion of the present procedure, the apparatuses may update the stored information based on information transmitted and/or received in the present procedure. Specifically, the AMF may store the authentication result for each piece of S-NSSAI based on the transmission and reception of the authentication result. For example, in response to transmitting and/or receiving a "success" as an authentication result, the AMF may store, as information of the UE, the state of a "success" in the Network Slice-Specific Authentication and Authorization in association with the S-NSSAI transmitted and/or received along with the authentication result. Similarly, in response to transmitting and/or receiving a "failure" as an authentication result, the AMF may store, as information of the UE, the state of a "failure" in the Network Slice-Specific Authentication and Authorization in association with the S-NSSAI transmitted and/or received along with the authentication result.

In a case that the present procedure is a procedure initiated based on reception of the registration request message from the UE, the AMF may update the allowed NSSAI and/or the rejected NSSAI for the UE based on the transmission and/or reception of the authentication result. Specifically, for example, in response to transmitting and/or receiving a "success" as an authentication result, the AMF may store, as the allowed NSSAI, the S-NSSAI transmitted and/or received along with the authentication result, or may associate the S-NSSAI with "allowed" for storage. Similarly, in response to transmitting and/or receiving a "failure" as an authentication result, the AMF may store, as the rejected NSSAI, the S-NSSAI transmitted and/or received along with the authentication result, or may associate the S-NSSAI with "rejected" for storage.

Based on the transmission and/or reception of the authentication result, the UE may store the authentication result for each piece of S-NSSAI. Specifically, for example, in response to transmitting and/or receiving a "success" as an authentication result, the UE may store, as information of the UE, the state of a "success" in the Network Slice-Specific Authentication and Authorization in association with the S-NSSAI transmitted and/or received along with the authentication result. Similarly, in response to transmitting and/or receiving a "failure" as an authentication result, the UE may store, as information of the UE, the state of a "failure" in the Network Slice-Specific Authentication and Authorization in association with the S-NSSAI transmitted and/or received along with the authentication result.

Based on completion of the present procedure, the apparatuses may perform processing based on update of the stored information. For example, based on completion of the procedure, the AFM may initiate the UE configuration update procedure in a case that a change has been made in the S-NSSAI included in the allowed NSSAI and/or rejected. NSSAI for the UE. The AMF may use the UE configuration update procedure to notify the UE of new allowed NSSAI and new rejected NSSAI.

3.4. UE Configuration Update Procedure

Figure 8:
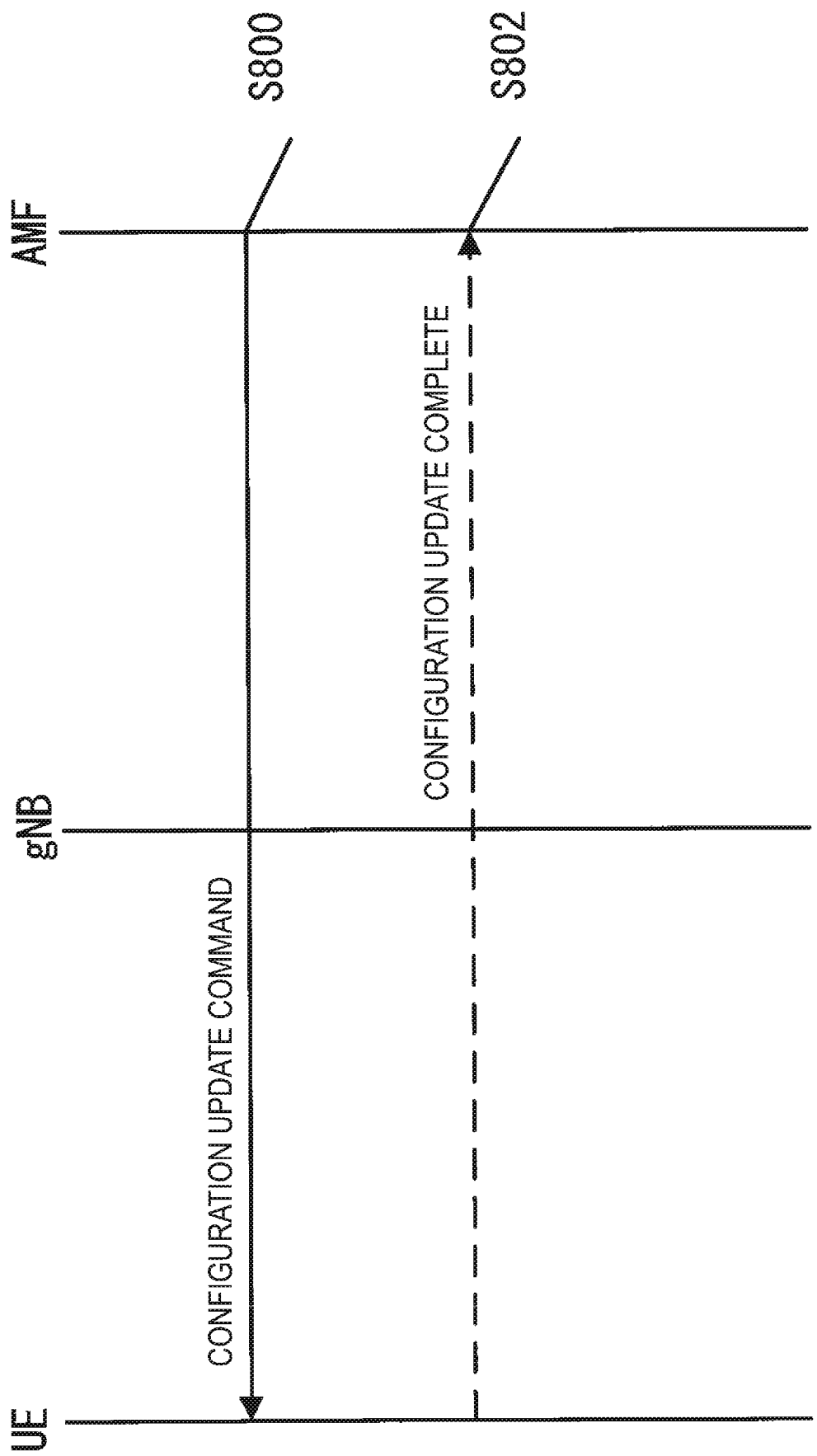
FIG. 8 is a diagram illustrating a UE configuration change/update procedure.

Next, the UE configuration update procedure (Generic UE configuration update procedure) will be described with reference to FIG. 8. The UE configuration update procedure is hereinafter also referred to as the present procedure. The present procedure is a procedure for the core network to update configuration information of the UE. The present procedure may be a procedure for mobility management that is initiated by the network with respect to the UE registered with the network.

In addition, the apparatus in the core network, such as the AMF, may initiate the present procedure, based on update of a configuration of the network and/or update of an operator policy. Note that a trigger of the present procedure may be detection of mobility of the UE, may be detection of state change of the UE, and/or the access network, and/or the core network, or may be state change of the network slice. In addition, the trigger of the present procedure may be reception of a request from the DN and/or an application server of the DN, change of a configuration of the network, or may be change of the operator policy. In addition, the trigger of the present procedure may be expiration of the operating timer. Note that the trigger for the apparatus in the core network to initiate the present procedure is not limited to these. In other words, the present procedure may be performed at any timing after the above-described registration procedure and/or PDU session establishment procedure completes. In addition, the present procedure may be performed at any timing on the condition that each apparatus is in a state in which each apparatus has established a 5GMM context and/or each apparatus is in a state in which each apparatus is in the 5GMM connected mode.

During the present procedure, each apparatus may transmit and/or receive a message including identification information for changing configuration information of the UE and/or identification information for stopping or changing the function being performed by the UE. In addition, based on completion of the present procedure, each apparatus may update the configuration information to a configuration specified by the network, or may start a behavior specified by the network.

The UE may update the configuration information of the UE, based on the control information transmitted and/or received in the present procedure. In addition, the UE may stop the function being performed, or may start a new function, along with update of the configuration information of the UE. In other words, the apparatus in the core network may initiate the present procedure and further transmit a control message and control information of the present procedure to the UE so as to cause the UE to update the configuration information of the UE that can be identified using these pieces of control information. In addition, by causing update of the configuration information of the UE, the apparatus in the core network may cause stop of the function being performed by the UE, or may cause the UE to start a new function.

First, the AMF sends a Configuration update command message to the UE via the 5G AN (or the gNB) (S800), thus initiating the UE configuration update procedure.

The AMF may include, in the configuration update command message, one or more pieces of information of the 21st to 25th identification information. Note that, by transmitting one or more pieces of information of the 21st to 25th identification information, the AMF may indicate new configuration information of the UE, or may request update of the configuration information of the UE. Note that information indicating the support of each function and information indicating a request for the use of each function may be transmitted and/or received as the same piece of identification information or different pieces of identification information.

In addition, in a case of multiple pieces of identification information transmitted and/or received, two or more pieces of identification information may be configured as one or more pieces of identification information. Note that information indicating the support of each function and information indicating a request for the use of each function may be transmitted and/or received as the same piece of identification information or different pieces of identification information.

Note that the AMF may select and determine whether to include the 21st to 25th identification information in the configuration update command message, based on each piece of received identification information, and/or subscriber information, and/or capability information of the network, and/or the operator policy, and/or the state of the network, and/or registration information of the user, and/or the context stored in the AMF, and/or the like.

By transmitting the configuration update command message based on each piece of received identification information, and/or subscriber information, and/or capability information of the network, and/or the operator policy, and/or the state of the network, and/or registration information of a user, and/or a context stored in the AMF, and/or the like, the AMF may indicate a request for update of the configuration information of the UE.

The UE receives the configuration update command message via the 5G AN (gNB) (S800). The UE may update the configuration information of the UE, based on the configuration update command message, and/or identification information included in the configuration update command message.

In response to receiving the 21st identification information, the UE may update the eNB NSSAI stored by the UE. Specifically, the UE may replace the 21st identification information received as new allowed NSSAI.

In response to receiving at least one piece of identification information of the 22nd to 24th identification information, the UE may update the rejected NSSAI stored by the Specifically, in response to receiving the 22nd identification information, the UE may add the rejected NSSAI included in the 22nd identification information to the rejected NSSAI stored by the UE, or may update the rejected. NSSAI stored by the UE to the rejected NSSAI included in the 22nd identification information.

For example, in a case that the 22nd identification information includes at least S-NSSAI and a cause value and further that the UE has already stored the rejected NSSAI, the UE may store the S-NSSAI included in the 22nd identification information in addition to the rejected NSSAI already stored by the UE without deleting the already stored rejected NSSAI. Alternatively, the UE may delete the already stored rejected NSSAI and store the S-NSSAI included in the 22nd identification information as the rejected NSSAI.

Based on reception of the 24th identification information, the UE may update information related to the NSSAI of the UE. Specifically, in a case that the UE stores the first rejected NSSAI and in a case that the UE receives the 24th identification information and further that the S-NSSAI associated with the 24th identification information is included in the first rejected NSSAI, the UE may delete the S-NSSAI from the first rejected NSSAI and include the S-NSSAI in the second rejected NSSAI for storage.

Based on reception of the 25th identification information, the UE may initiate the registration procedure after completing the present procedure. The registration procedure initiated by the UE may be the registration procedure described in Chapter 3.

Note that each type of processing performed by the UE based on reception of each piece of identification information described above may be performed during the present procedure or after completion of the present procedure, or may be performed based on completion of the present procedure after completion of the present procedure. In addition, the UE may transmit a Configuration update complete message to the AMF via the 5G AN (gNB) as a response message to the configuration update command message based on the identification information included in the configuration update command message (S802).

In a case that the UE sends the configuration update complete command message, the AMF receives the configuration update complete message via the 5G AN (gNB) (S802). Each apparatus completes the present procedure, based on transmission and/or reception of the configuration update command message and/or the configuration update complete message.

In addition, based on completion of the present procedure, each apparatus may perform processing based on information transmitted and/or received in the present procedure. For example, in a case that update information for configuration information is transmitted and/or received, each apparatus may update the configuration information. In addition, in a case that information indicating that the registration procedure needs to be performed is transmitted and/or received, the UE may initiate the registration procedure, based on completion of the present procedure.

In addition, based on completion of the present procedure, the UE may store identification information received together with the configuration information command message, or may recognize determination of the network. Based on completion of present procedure, the UE may perform each procedure based on the stored information.

In the procedure described above, by transmitting and/or receiving the configuration update command message, the apparatuses in the core network can indicate, to the UE, update of configuration information already applied by the UE and indicate stoppage or change of the function being performed by the UE.

4. EMBODIMENTS

Embodiments of the present invention will be described below.

4.1. First Embodiment

Figure 9:
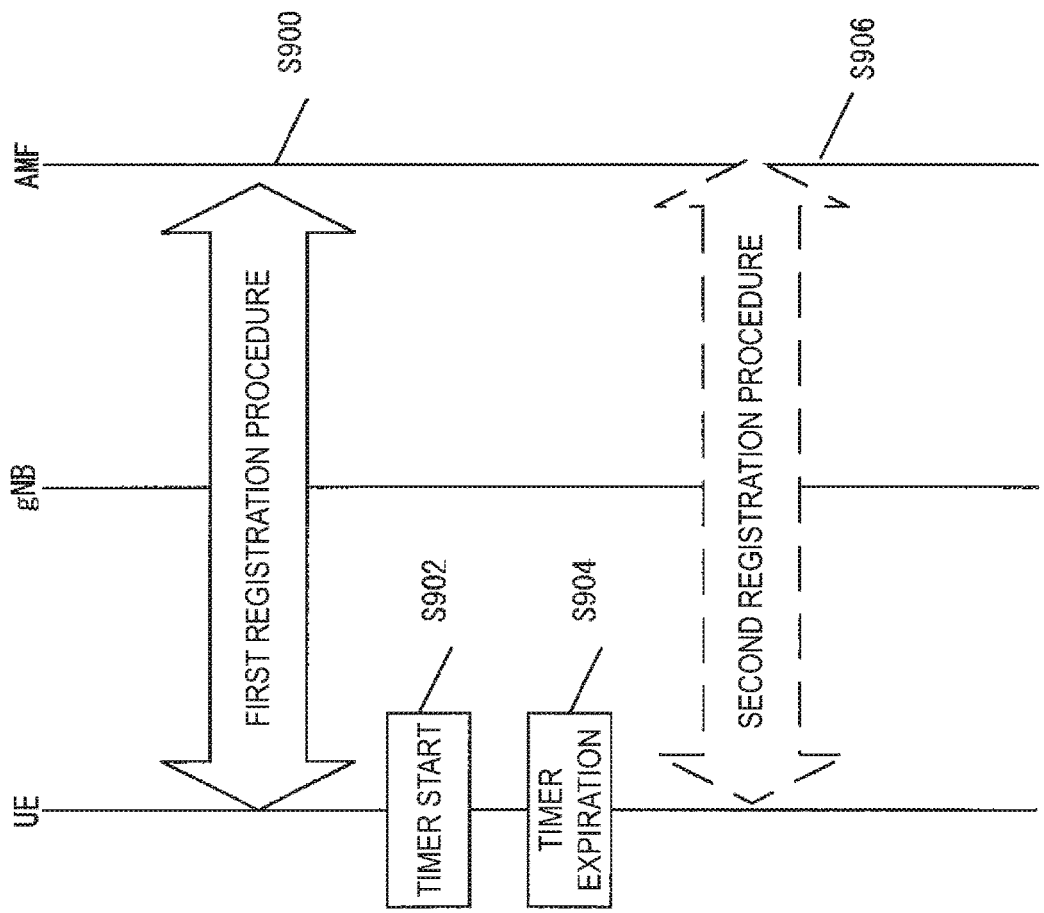
FIG. 9 is a diagram illustrating a first embodiment.

A first embodiment will be described with reference to FIG. 9, Hereinafter, in the present embodiment, the first embodiment is meant. In the present embodiment, in an embodiment described below, in a case that, in a registered state in which the UE stores pending NSSAI including at least one piece of S-NSSAI, the UE receives no notification of results of the pending state from the network within a certain period of time, the UE deletes the pending NSSAI.

The present embodiment includes a first registration procedure (S900), timer start (S902), timer expiration (S904), and a second registration procedure (S906). Note that as the first registration procedure and the second registration procedure, the registration procedure described above is used, Note that, in the present embodiment, the new AMF and the AMF may be the same apparatus.

First, the UE performs the first registration procedure by transmitting the registration request message (S900). In the first registration procedure, the UE receives the registration accept message from the AMF, and completes the first registration procedure. At this time, based on completion of the first registration procedure, the UE enters the registered state in which the UE stores at least one piece of S-NSSAI as the first rejected NSSAI.

The UE begins counting the timer based on completion of the first registration procedure and/or receiving the registration accept message and/or receiving the identification information included in the registration accept message (S902). Specifically, the UE starts counting the timer to limit the storage of the first rejected NSSAI. Note that the value of the timer may be a value indicated by the 17th identification information received from the AMF in the first registration procedure, or may be a timer value managed/stored by the UE in advance. For example, the timer value may be intended to perform a periodic registration procedure.

The UE expires counting of the timer and/or the timer (S904), In response to expiration of the timer, the UE deletes the information of the first rejected NSSAI stored by the UE. Specifically, based on expiration of the timer, the UE deletes the pending rejected NSSAI for the Network Slice Specific Authentication and Authorization.

The UE may initiate the second registration procedure based on expiration of the timer and/or deletion of the first rejected NSSAI. Note that the transmission destination of the registration request message in the second registration procedure may be different from the transmission destination for the first registration request message.

In the second registration procedure, the UE may transmit the registration request message including the second identification information, and may include, in the second identification information, the S-NSSAI included in the first rejected NSSAI deleted by the UE based on expiration of the timer, before transmitting the second identification information.

In other words, in the present embodiment, after managing, for a certain period of time, a slice notified as pending rejected NSSAI for the Network Slice Specific authentication and authorization, the UE can transmit the registration request message requesting the corresponding S-NSSAI without waiting for a notification from the network.

4.2. Second Embodiment

Figure 10:
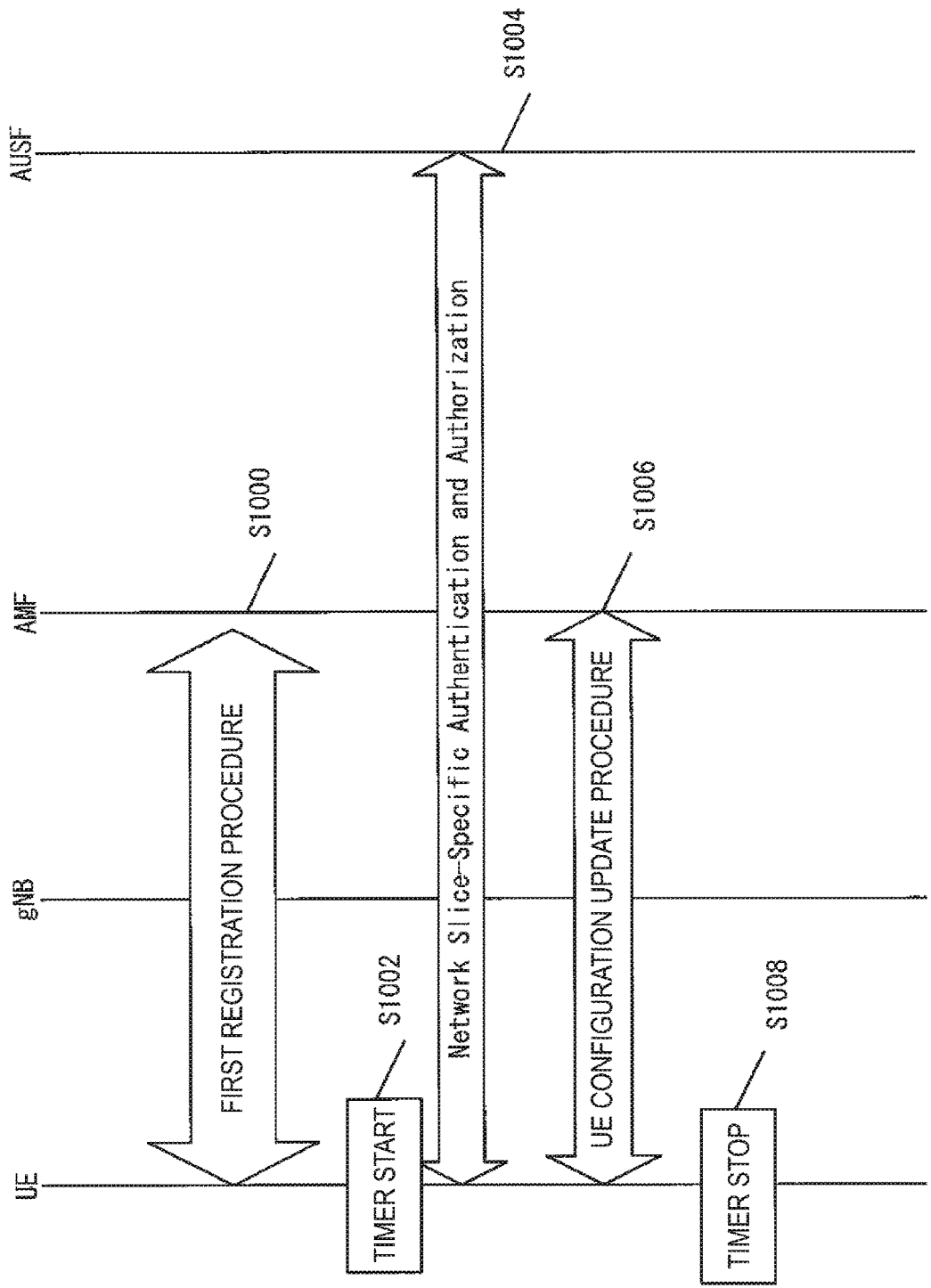
FIG. 10 is a diagram illustrating a second embodiment.

Now, a second embodiment will be described with reference to FIG. 10, The present embodiment means the first embodiment. In the present embodiment, in a case described below, in a registered state in which the UE stores pending NSSAI including at least one piece of S-NSSAI, the UE receives, from the network within a certain period of time, a message notifying the results of the Network Slice-Specific Authentication and Authorization.

In the second embodiment, the present embodiment includes a first registration procedure (S1000), timer start (S1002), Network Slice-Specific Authentication and Authorization (S1004), a UE configuration update procedure (S1006), and timer stop (S1008). Note that the registration procedure described above is used as the first registration procedure and that the Network Slice-Specific Authentication and Authorization described above is used as the Network Slice-Specific Authentication and Authorization and that the UE configuration update procedure described above may be used as the UE configuration update procedure. Note that, in the present embodiment, the new AMF and the AMF may be the same apparatus.

First, the UE performs the first registration procedure by transmitting the registration request message (S1000). In the first registration procedure, the UE receives the registration accept message from the AMF, and completes the first registration procedure. At this time, the UE enters a state in which at least one piece of S-NSSAI is stored as the first rejected NSSAI.

Based on completion of the first registration procedure and/or reception of the registration accept message and/or reception of the identification information included in the registration accept message, the UE starts counting the timer (S1002). Specifically, the UE starts counting the timer to limit the storage of the first rejected NSSAI. Note that the value of the timer may be a value indicated by the 17th identification information received from the AMF in the first registration procedure, or may be a timer value managed/stored by the UE in advance. For example, the timer value may be intended to perform a periodic registration procedure.

Based on completion of the first registration procedure, the UE, the AMF, and the AUSF initiate the Network Slice-Specific Authentication and Authorization. Specifically, in the first registration procedure, in a case that the UE is notified of the pending NSSAI for the Network Slice-Specific Authentication and Authorization, the AMF performs the Network Slice-Specific Authentication and Authorization procedure on the S-NSSAI included in the NSSAI.

In this regard, in a case that the pending NSSAI includes multiple pieces of S-NSSAI, the AMF may perform the Network Slice-Specific Authentication and Authorization procedure for each piece of S-NSSAI or may process multiple pieces of S-NSSAI by performing a single Network Slice-Specific Authentication and Authorization procedure.

Note that the Network Slice-Specific Authentication and Authorization procedure may be initiated before or after the start of the timer or in parallel with the start of the timer.

The AMF may update the information related to the NSSAI for the UE based on completion of the Network Slice-Specific Authentication and Authorization procedure. Specifically, for example, in response to a success in authentication for a certain piece of S-NSSAI as a result of the Network Slice-Specific Authentication and Authorization procedure, the AMF may include the S-NSSAI in the allowed NSSAI for storage or associate the S-NSSAI with the "allowed" state for storage.

For example, in response to a failure in authentication for a certain piece of S-NSSAI as a result of the Network Slice-Specific Authentication and Authorization procedure, the AMF may include the S-NSSAI in the rejected NSSAI (second rejected NSSAI) due to the failure in the Network Slice-Specific Authentication and Authorization and store the rejected. NSSAI, or may associate the S-NSSAI with the "rejected" state and a cause value indicating the failure in the Network Slice-Specific Authentication and Authorization and store the S-NSSAI.

The UE and the AMF perform the UE configuration update procedure based on completion of the Network Slice-Specific Authentication and Authorization procedure and/or update of information related to the NSSAI for the UE.

Note that the AMF may perform the UE configuration update procedure after completion of all the Network Slice-Specific Authentication and Authorization procedures, or may perform the UE configuration update procedure before completion of all the Network Slice-Specific Authentication and Authorization procedures and after completion of the Network Slice-Specific Authentication and Authorization procedure for at least one piece of S-NSSAI, according to the network policy. In other words, based on the network policy, the UE and the AMF may perform S1004 and S1006 multiple times.

The UE may stop the timer based on completion of the UE configuration update procedure and/or based on reception of a message of the UE configuration update procedure and/or based on reception of one or multiple pieces of identification information included in the message received in the UE configuration update procedure.

Specifically, in response to receiving the allowed NSSAI and/or rejected NSSAI from the AMF, the UE updates the information of the allowed NSSAI and/or rejected NSSAI stored by the UE. The UE may stop the timer based on the lack of the pending NSSAI in the information of the updated rejected NSSAI.

In other words, while storing the first rejected NSSAI, in a case that the UE receives, from the AMF, the allowed NSSAI or the rejected NSSAI for pending for the Network Slice-Specific Authentication and Authorization including one or multiple pieces of S-NSSAI included in the first rejected NSSAI, then the UE may stop the timer.

4.3. Third Embodiment

Figure 11:
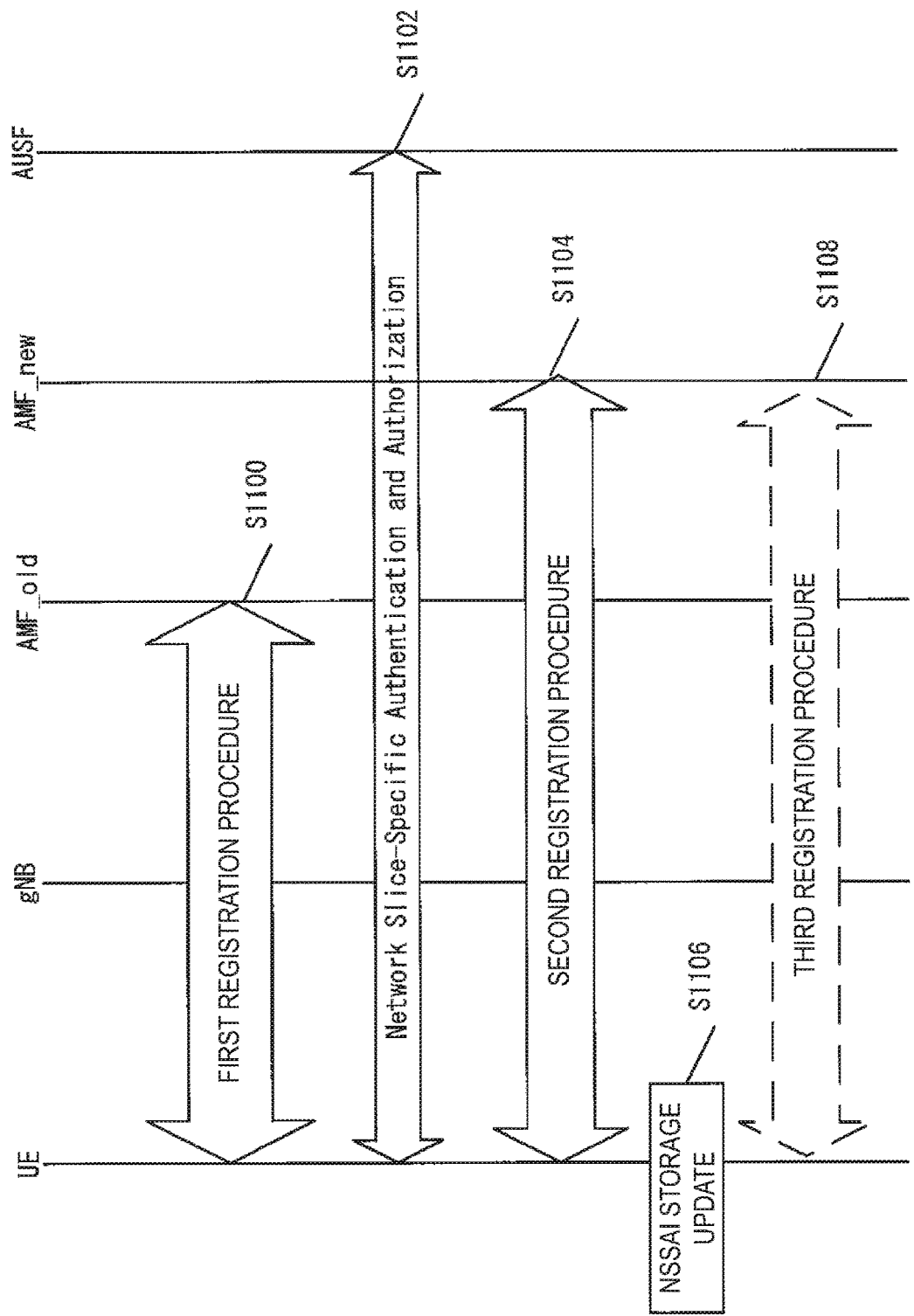
FIG. 11 is a diagram illustrating a third embodiment.

A third embodiment will be described with reference to FIG. 11. Hereinafter, the present embodiment refers to the third embodiment. In the present embodiment, a case will be described in which with the procedure for at least one piece of S-NSSAI made pending for the Network Slice-Specific Authentication and Authorization by the UE, in a case that a change of the AMF occurs, the UE appropriately manages the NSSAI storage.

Specifically, in the present embodiment, a case will be described in which, with the NSSAI pending between the UE and the network, in a case that a change of the AMF occurs, the UE can delete the first rejected NSSAI and request again, from the network, the S-NSSAI included in the rejected NSSAI. Alternatively, in the present embodiment, a case will be described in which, with the NSSAI pending between the UE and the network, in a case that a change of the AMF occurs, the UE receives update information based on an authentication result for the S-NSSAI made pending by the change destination AMF, and based on reception of the update information, updates the storage, and performs the registration request procedure based on the updated storage.

The present embodiment includes a first registration procedure (S1100), Network Authentication and Authorization (S1102), a second registration procedure (S1104), NSSAI storage update (S1106), and a third registration procedure (S1108). Note that the registration procedure described in Chapter 3 may be used as the first registration procedure, the second registration procedure, and the third registration procedure and that the Network Slice-Specific Authentication and Authorization described in Chapter 3 may be used as the Network Slice-Specific Authentication and Authorization.

Note that the first registration procedure may be a procedure by which the UE is registered with the AFM_old and that the AMF_old for the first registration procedure may be the new AMF in FIG. 6. Furthermore, the second registration procedure is a procedure by which the UE is registered with the AMF_new, the AMF_new in the second registration procedure may be the new AMF in FIG. 6, and the AMF_old in the second registration procedure may be the old AMF in FIG. 6.

First, in order to register with the AMF_old, the UE performs the first registration procedure by transmitting the registration request message (S1100). In the first registration procedure, the UE receives the registration accept message from the AMF, and completes the first registration procedure. After completing the first registration procedure, the UE enters the registered state in which at least one piece of S-NSSAI is stored as the first rejected NSSAI.

Based on completion of the first registration procedure, the UE, the AMF_old, and the AUSF initiate the Network Slice-Specific Authentication and Authorization. Specifically, in the first registration procedure, in a case that the UE is notified of the pending NSSAI for the Network Slice-Specific Authentication and Authorization, the AMF performs the Network Slice-Specific Authentication and Authorization procedure on the S-NSSAI included in the NSSAI.

In this regard, in a case that the pending NSSAI includes multiple pieces of S-NSSAI, the AMF may perform the Network Slice-Specific Authentication and Authorization procedure for each piece of S-NSSAI or may process multiple pieces of S-NSSAI by performing a single Network Slice-Specific Authentication and Authorization procedure.

The UE can initiate a second registration procedure for registration with the AMF new in parallel with the Network Slice-Specific Authentication and Authorization procedure. Note that the UE need not request registration with the AMF_new in initiating the second registration procedure. Specifically, the UE may include, in the registration request message, AMF identification information for identifying the AMF_old, before transmitting the registration request message.

In the second registration procedure, the UE does not request the S-NSSAI included in the rejected NSSAI received from the AMF in the first registration procedure. In other words, in the second registration procedure, in a case that the rejected NSSAI is stored in the NSSAI storage, the UE sends the registration request message without including, in the second identification information, the S-NSSAI included in the rejected NSSAI.

Based on reception of the registration request message during the second registration procedure, the AMF_new sends a request message for the UE context to the AMF_old in accordance with the AME identification information included in the registration request message.

The AMF_old sends the UE context based on reception of the request message from the AMF_new. In this regard, the UE context may include a UE ID such as a SUbscription Permanent Identifier (SUPI) or a Globally Unique Temporary Identifier (GUTI), or allowed NSSAI for each access. Furthermore, the UE context may include the information of the rejected NSSAI and/or configured NSSAI.

Furthermore, the allowed NSSAI and rejected NSSAI and configured NSSAI included in the UE context may respectively be associated with information as to whether the UE has been notified of the allowed NSSAI and rejected NSSAI and configured NSSAI.

Based on reception of the UE context, the AMF_new uses the information included in the UE context to create a UE context. The AMF_new determines whether to accept the UE registration request, and performs step (A) in FIG. 6 in a case that the AMF new accepts the UE registration request, while performing step (B) in FIG. 6 to complete the second registration procedure in a case that the AMF_new rejects the UE registration request.

Note that in response to receiving the rejected NSSAI and the allowed NSSAI from the AMF_old, the AMF_new may include the allowed NSSAI and rejected NSSAI received in the registration accept message before transmitting the registration accept message.

The UE may update the NSSAI storage based on completion of the second registration procedure (S1106). Specifically, for example, in the second registration procedure, the UE receives the registration accept message and detects a change of the AMF in the registration accept message based on reception of the 18th identification information and/or the 19th identification information. In response to detection of a change of the AMF and/or based on reception of the registration accept message, the UE may delete the first rejected NSSAI included in the NSSAI storage.

The UE may perform and initiate a third registration request procedure based on update of the information related to the NSSAI (NSSAI storage). Specifically, in a case that the UE deletes the rejected NSSAI for the pending Network Slice-Specific Authentication and Authorization, from the NSSAI storage as a result of update of information related to the NSSAI, the UE may initiate the third registration procedure by transmitting the registration request message requesting the S-NSSAI included in the deleted rejected NSSAI. Note that in order to request the S-NSSAI included in the deleted rejected NSSAI, the UE may include, in the second identification information, the S-NSSAI included in the deleted rejected NSSAI, before transmitting the second identification information.

As described above, in a case that a change of the AMF occurs while the apparatuses store the rejected NSSAI for the pending Network Slice-Specific Authentication and Authorization, the storage related to the rejected NSSAI can be deleted or updated.

5. MODIFIED EXAMPLES

A program running on an apparatus according to the present invention may serve as a program that controls a Central Processing Unit (CPU) and the like to cause a computer to operate in such a manner as to realize the functions of the above-described embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing such functions of the embodiment according to the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or may be a processor of a known type, a controller, a microcontroller, or a state machine instead. The above-mentioned electric circuit may include a digital circuit, or may include an analog circuit. In a case that with advances in semiconductor technology, a circuit integration technology appears that replaces the present integrated circuits, one or multiple aspects of the present invention are also possible to use a new integrated circuit based on the technology.

Note that the invention of the present application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

Although, the embodiments of the present invention have been described in detail above referring to the drawings, the specific configuration is not limited to the embodiments and includes, for example, design changes within the scope not departing from the gist of the present invention. Furthermore, in the present invention, various modifications are possible within the scope of claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

REFERENCE SIGNS LIST

1 Mobile communication system
10 UE_A
30 PGW-U
32 PGW-C
35 SGW
40 MME
45 eNB
50 HSS
60 PCRF
80 ACCESS NETWORK_A (E-UTRAN)
90 Core network_A
120 ACCESS NETWORK_B (5G AN)
122 gNB
130 UPF
132 SMF
140 AMF
150 UDM
160 PCF
190 Core network_B

The invention claimed is:

1. A User Equipment (UE) comprising:
a transmission and reception unit;
a controller; and
a storage, wherein
the controller is configured to store a first Single Network Slice Selection Assistance Information (S-NSSAI), which is pending for a network slice-specific authentication and authorization, into a first Network Slice Selection Assistance Information (NSSAI) in the storage,
the transmission and reception unit is configured to receive a Configuration update command message including an allowed NSSAI from a core network, and
in a case that the first S-NSSAI is included in the allowed NSSAI, the controller is further configured to remove the first S-NSSAI from the first NSSAI in the storage, and
in a case that the Configuration update command message includes a rejected NSSAI for a failed or revoked Network Slice-Specific Authentication and Authorization and the first S-NSSAI is included in the rejected NSSAI, the controller is further configured to remove the first S-NSSAI from the first NSSAI in the storage and store the first S-NSSAI into a second NSSAI in the storage.

2. The UE according to claim 1, wherein
the controller does not include the first S-NSSAI, which is stored in the storage, in a requested NSSAI.

3. The UE according to claim 1, wherein
in a registration procedure, the transmission and reception unit is further configured to send a registration request message including capability information, which indicates whether the UE supports the network slice-specific authentication and authorization, to the core network.

4. A communication control method for a User Equipment (UE), the communication control method comprising:
storing a first Single Network Slice Selection Assistance Information (S-NSSAI), which is pending for a network slice-specific authentication and authorization, into a first Network Slice Selection Assistance Information (NSSAI) in a storage;
receiving a Configuration update command message including an allowed NSSAI from a core network;
in a case that the first S-NSSAI is included in the allowed NSSAI, removing the first S-NSSAI from the first NSSAI in the storage; and
in a case that the Configuration update command message includes a rejected NSSAI for a failed or revoked Network Slice-Specific Authentication and Authorization and the first S-NSSAI is included in the rejected NSSAI, removing the first S-NSSAI from the first NSSAI in the storage and storing the first S-NSSAI into a second NSSAI in the storage.

* * * * *